(12) United States Patent
Euzen et al.

(10) Patent No.: US 7,563,743 B2
(45) Date of Patent: Jul. 21, 2009

(54) DOPED CATALYST AND IMPROVED PROCESS FOR TREATMENT OF HYDROCARBON FEEDSTOCKS

(75) Inventors: Patrick Euzen, Paris (FR); Alexandra Chaumonnot, Lyons (FR); Carole Bobin, Marly le Roi (FR); Patrick Bourges, Lyons (FR); Christophe Gueret, St Romain en Gal (FR); Hugues Dulot, Evry (FR)

(73) Assignee: Institute Francais du Petrole, Rueil Malmaison Cedex (FR)

( * ) Notice: Subject to any disclaimer, the term of this patent is extended or adjusted under 35 U.S.C. 154(b) by 200 days.

(21) Appl. No.: 11/221,416

(22) Filed: Sep. 8, 2005

(65) Prior Publication Data

US 2006/0070915 A1 Apr. 6, 2006

(30) Foreign Application Priority Data

Sep. 8, 2004 (FR) .................................. 04 09546

(51) Int. Cl.
| | |
|---|---|
| *B01J 27/00* | (2006.01) |
| *B01J 21/00* | (2006.01) |
| *B01J 23/00* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 20/00* | (2006.01) |
| *C07C 4/02* | (2006.01) |
| *C10G 11/00* | (2006.01) |
| *C10G 11/02* | (2006.01) |

(52) U.S. Cl. ........................ 502/208; 502/254; 502/255; 502/256; 502/267; 502/258; 502/259; 502/260; 502/261; 502/262; 502/263; 502/305; 502/313; 502/314; 502/315; 502/316; 502/319; 502/320; 502/321; 502/323; 502/326; 502/327; 502/322; 502/333; 502/334; 502/335; 502/336; 502/337; 502/338; 502/339; 502/407; 502/415; 502/439; 208/113; 208/114; 208/121; 208/123; 208/124; 585/651; 585/653

(58) Field of Classification Search ......... 502/254–263, 502/305, 313–316, 319–323, 326, 327, 332–339, 502/407, 415, 439; 208/113, 114, 121, 123, 208/124

See application file for complete search history.

(56) References Cited

U.S. PATENT DOCUMENTS

| 4,689,314 | A | | 8/1987 | Martinez et al. |
|---|---|---|---|---|
| 5,292,426 | A | | 3/1994 | Holland et al. |
| 6,136,179 | A | * | 10/2000 | Sherwood et al. ............ 208/109 |
| 6,733,657 | B2 | * | 5/2004 | Benazzi et al. .............. 208/110 |
| 7,270,738 | B2 | * | 9/2007 | Euzen et al. ............. 208/111.3 |
| 2004/0138059 | A1 | | 7/2004 | Euzen et al. |

FOREIGN PATENT DOCUMENTS

| EP | 1415712 | 5/2004 |
|---|---|---|
| FR | 2667610 | 4/1992 |
| FR | 2850393 | 7/2004 |

* cited by examiner

*Primary Examiner*—Patricia L Hailey
(74) *Attorney, Agent, or Firm*—Millen, White, Zelano & Branigan, P.C.

(57) ABSTRACT

This invention relates to doped catalysts on an aluminosilicate substrate with a low content of macropores and the hydrocracking/hydroconversion and hydrotreatment processes that use them. The catalyst comprises at least one hydro-dehydrogenating element that is selected from the group that is formed by the elements of group VIB and group VIII of the periodic table and a dopant in a controlled quantity that is selected from among phosphorus, boron, and silicon and a non-zeolitic substrate with a silica-alumina base that contains a quantity of more than 15% by weight and of less than or equal to 95% by weight of silica ($SiO_2$).

42 Claims, No Drawings

DOPED CATALYST AND IMPROVED PROCESS FOR TREATMENT OF HYDROCARBON FEEDSTOCKS

FIELD OF THE INVENTION

This invention relates to doped catalysts on aluminosilicate substrates and the hydrocracking, hydroconversion and hydrotreatment processes that use them.

The objective of the process is essentially the production of middle distillates, i.e., fractions with an initial boiling point of at least 150° C. and a final boiling point that goes just up to the initial boiling point of the residue, for example less than 340° C. or else 370° C.

PRIOR ART

The hydrocracking of heavy petroleum fractions is a very important refining process that makes it possible to produce, starting from excess heavy feedstocks that cannot be readily upgraded, lighter fractions such as gasolines, jet fuels and light gas oils that the refiner seeks in order to adapt his production to the structure of the demand. Certain hydrocracking processes make it possible also to obtain a highly purified residue that can provide excellent bases for oils. Relative to the catalytic cracking, the advantage of catalytic hydrocracking is to provide middle distillates, jet fuels and gas oils of very good quality. Conversely, the gasoline that is produced exhibits a much lower octane number than the one that is obtained from catalytic cracking.

Hydrocracking is a process that draws its flexibility from three main elements that are the operating conditions that are used, the types of catalysts that are employed, and the fact that the hydrocracking of hydrocarbon feedstocks can be carried out in one or two stages.

The hydrocracking catalysts that are used in the hydrocracking processes are all of the bifunctional type that combine an acid function with a hydrogenating function. The acid function is provided by substrates whose surface areas generally vary from 150 to 800 $m^2 \cdot g^{-1}$ and exhibit a surface acidity, such as halogenated aluminas (chlorinated or fluorinated in particular), combinations of boron oxides and aluminum oxides, amorphous silica-aluminas and zeolites. The hydrogenating function is provided either by one or more metals of group VIII of the periodic table, or by a combination of at least one metal of group VIB of the periodic table and at least one metal of group VIII.

The balance between the two acid and hydrogenating functions is one of the parameters that govern the activity and the selectivity of the catalyst. A weak acid function and a strong hydrogenating function provide low-activity catalysts that work at a generally elevated temperature (higher than or equal to 390-400° C.) and at a low feed volumetric flow rate (the VVH that is expressed by volume of feedstock to be treated per unit of volume of catalyst and per hour is generally less than or equal to 2), but that are endowed with a very good selectivity of middle distillates. Conversely, a strong acid function and a weak hydrogenating function provide active catalysts but exhibit less favorable selectivities in middle distillates (jet fuels and gas oils).

A type of conventional hydrocracking catalysts has a base of moderately acidic amorphous substrates, such as silica-aluminas, for example. These systems are used to produce good-quality middle distillates and optionally oil bases. These catalysts are used in, for example, the two-stage processes.

The performance levels of these catalysts are closely linked to their physico-chemical characteristics and more particularly to their textural characteristics. Thus and in a general way, the presence of macropores in the catalysts that comprise a silica-alumina (such as those described in, for example, U.S. Pat. No. 5,370,788) is a drawback. Macropores are defined as pores whose diameter is greater than 500 Å. It is also advantageous to increase the packing density of catalysts so as to increase their catalytic performance levels. In this connection, it is advantageous to use catalysts with a low total pore volume. For the same total pore volume, a better catalytic activity is thus obtained.

Patent EP 1 415 712 describes a catalyst that is used in the hydrocracking and treatment processes that comprise at least one hydro-dehydrogenating element that is selected from the group that is formed by the elements of group VIB and group VIII of the periodic table and a non-zeolitic substrate with a silica-alumina base that contains a quantity of more than 5% by weight and less than or equal to 95% by weight of silica and whose pore volume, measured by mercury porosimetry and encompassed in the pores with a diameter of more than 500 Å, is less than 0.01 ml/g. This catalyst optionally can contain at least one dopant that is selected from the group that is formed by phosphorus, boron and silicon whose oxide content is between 0.1% and 15% by weight. The use of this type of catalyst to carry out the hydrocracking of hydrocarbon feedstocks makes it possible to obtain high levels of conversion of the feedstock and advantageous middle distillate selectivities.

Another document (U.S. Pat. No. 5,292,426) describes a process for conversion of paraffin hydrocarbon feedstocks with a high pour point into hydrocarbon products with a reduced pour point and a high viscosity, whereby such products are intended to be used as lubricating oils. The catalyst that is used in this process can contain 2 to 10% by weight of a non-noble metal of group VIII, 5 to 30% of group VIB of the periodic table, 0 to 2% by weight of phosphorus, 0 to 10% halogen and a substrate with a silica-alumina base that contains 0 to 15% by weight of silica and 85 to 99.5% by weight of alumina. Such catalysts make it possible to obtain products with high viscosity and that have a reduced pour point with high yields.

Although good performance levels can be obtained by improving the textural characteristics, the performance levels of these catalysts are also linked to the nature of the hydrogenating phase. The hydrogenating activity thus will play a role in the reactions of hydrodesulfurization (HDS), hydrodenitrogenation (HDN), hydrodearomatization (HDA) and on the stability of the catalyst.

Wanting to solve these problems, the applicants decided to prepare improved hydrocracking catalysts that have reduced contents of macropores and a hydrogenating function and that exhibit improved catalytic performance levels in the hydrocracking processes. It was thus discovered, surprisingly, that the addition of a controlled percentage of dopants to catalysts that have such textural characteristics leads to unexpected catalytic performance levels in hydrocracking/hydroconversion and hydrotreatment.

More specifically, the invention relates to a doped catalyst for hydrocracking on an aluminosilicate substrate with a reduced content of macropores and the processes of hydrocracking/hydroconversion and hydrotreatment that uses it.

Characterization Techniques

In the following disclosure of the invention, specific surface area is defined as the B.E.T. specific surface area that is determined by nitrogen adsorption according to ASTM Standard D 3663-78 established from the BRUNAUER-EM-METT-TELLER method described in the periodical "The Journal of American Society," 60, 309, (1938).

In the following disclosure of the invention, mercury volume of the substrates and catalysts is defined as the volume that is measured by mercury porosimeter intrusion according to the ASTM Standard D4284-83 at a maximum pressure of 4000 bar, using a surface tension of 484 dyne/cm and a contact angle for the amorphous silica-alumina substrates of 140°. The mercury mean diameter is defined as being a diameter such that all the pores of a size less than this diameter constitute 50% of pore volume ($V_{Hg}$) in an interval of between 36 and 1000. One of the reasons for which it is preferable to use the substrate as a base to define the pore distribution resides in the fact that the contact angle of the mercury varies after impregnation of metals based on the nature and type of metals. The wetting angle was assumed to be equal to 140° by following the recommendations of the work "Techniques de l'ingénieur, traité analyse et caractérisation [Techniques of the Engineer, Analytical Treatise and Characterization], pp. 1050-55, written by Jean Charpin and Bernard Rasneur."

So as to obtain a better specification, the value of the mercury volume in ml/g that is given in the following text corresponds to the value of the total mercury volume (total pore volume measured by mercury porosimeter intrusion) in ml/g that is measured on the sample minus the value of the mercury volume in ml/g that is measured on the same sample for a pressure corresponding to 30 psi (about 2 bar). The mean mercury diameter is also defined as being a diameter such that all the pores of a size less than this diameter constitute 50% of the total mercury pore volume.

To better characterize the pore distribution, the following pore distribution criteria of mercury are finally defined: volume V1 corresponds to the volume that is contained in the pores whose diameter is less than the mean diameter minus 30 Å. Volume V2 corresponds to the volume that is contained in the pores with a diameter that is greater than or equal to the mean diameter minus 30 Å and less than the mean diameter plus 30 Å. Volume V3 corresponds to the volume that is contained in the pores with a diameter of greater than or equal to the mean diameter plus 30 Å. Volume V4 corresponds to the volume that is contained in the pores whose diameter is less than the mean diameter minus 15 Å. Volume V5 corresponds to the volume that is contained in the pores with a diameter that is greater than or equal to the mean diameter minus 15 Å and less than the mean diameter plus 15 Å. Volume V6 corresponds to the volume that is contained in the pores with a diameter that is greater than or equal to the mean diameter plus 15 Å.

The pore distribution that is measured by nitrogen adsorption was determined by the Barrett-Joyner-Halenda (BJH) model. The nitrogen adsorption-desorption isotherm according to the BJH model is written in the periodical "The Journal of American Society," 73, 373 (1951) described by E. P. Barrett, L. G. Joyner and P. P. Halenda. In the following disclosure of the invention, nitrogen adsorption volume is defined as the volume that is measured for $P/P_0=0.99$, pressure for which it is assumed that nitrogen filled all the pores. The nitrogen desorption mean diameter is defined as being a diameter such that all of the pores that are smaller than this diameter constitute 50% of the pore volume (Vp) measured on the desorption branch of the nitrogen isotherm.

Adsorption surface area is defined as the surface area that is measured on the branch of the adsorption isotherm. Reference will be made to, for example, the article by A. Lecloux "Mémoires Société Royale des Sciences de Liège, $6^{ème}$ série [$6^{th}$ Series], Tome I [Volume 1], fasc. 4 [Section 4], pp. 169-209 (1971)."

The sodium content was measured by atomic absorption spectrometry.

X diffraction is a technique that can be used to characterize the substrates and catalysts according to the invention. In the following disclosure, the analysis of X rays is carried out on powder with a Philips PW 1830 diffractometer that operates by reflection and is equipped with a rear monochromator by using CoKalpha radiation ($\lambda K_{\alpha 1}$=1.7890 Å, $\lambda 1 K_{\alpha 2}$=1.793 Å, intensity ratio $K_{\alpha 1}/K_{\alpha 2}$=0.5). For the X diffraction diagram of the gamma-alumina, reference will be made to the ICDD data base, form 10-0425. In particular, the two most intense peaks are located at a position that corresponds to one d encompassed between 1.39 and 1.40 Å and one d encompassed between 1.97 Å to 2.00 Å. d is called the interreticular distance that is derived from the angular position by using the so-called Bragg's equation ($2d_{(hkl)}*\sin(\theta)=\eta*\lambda$). Gamma-alumina is defined in the text below, i.a., as, for example, an alumina contained in the group that consists of cubic gamma-aluminas, pseudo-cubic gamma-aluminas, tetragonal gamma-aluminas, poorly or slightly crystallized gamma-aluminas, large-surface gamma-aluminas, small-surface gamma-aluminas, gamma-aluminas that are obtained from coarse boehmite, gamma-aluminas that are obtained from crystallized boehmite, gamma-aluminas that are obtained from boehmite that is slightly or poorly crystallized, gamma-aluminas that are obtained from a mixture of crystallized boehmite and an amorphous gel, gamma-aluminas that are obtained from an amorphous gel, and gamma-aluminas evolving toward delta. For the positions of diffraction peaks of eta-, delta- and theta-aluminas, it is possible to refer to the article by B. C. Lippens and J. J. Steggerda in Physical and Chemical Aspects of Adsorbents and Catalysts, E. G. Linsen (Ed.), Academic Press, London. 1970, pp. 171-211.

For the substrates and catalysts according to the invention, the X diffraction diagram demonstrates a wide peak that is characteristic of the presence of amorphous silica.

Furthermore, in the entire text that follows, the alumina compound can contain an amorphous fraction that is difficult to detect by the DRX techniques. It will therefore be understood below that the alumina compounds that are used or described in the text can contain an amorphous or poorly crystallized fraction.

The substrates and catalysts according to the invention have been analyzed by NMR MAS of the solid of $^{27}$Al on a spectrometer of the Brücker Company such as MSL 400, with a 4 mm probe. The speed of rotation of the samples is on the order of 11 kHz. Potentially, the NMR of the aluminum makes it possible to distinguish three types of aluminum whose chemical displacements are presented below:

Between 100 and 40 ppm, tetra-coordinated-type aluminum, denoted as $Al_{IV}$,

Between 40 and 20 ppm, penta-coordinated-type aluminum, denoted as $Al_V$,

Between 20 and −100 ppm, hexa-coordinated-type aluminum, denoted as $Al_{VI}$.

The aluminum atom is a quadripolar core. Under certain analysis conditions (weak radiofrequency fields: 30 kHz, low-impulse angle: $\pi/2$ and water-saturated sample), the NMR technique of magic angle rotation (MAS) is a quantitative technique. The decomposition of the NMR MAS spectra makes it possible to gain access directly to the quantity of different radicals. The spectrum is locked in chemical displacement relative to a 1 M solution of aluminum nitrate. The aluminum signal is at zero ppm. We chose to integrate the signals between 100 and 20 ppm for the $Al_{IV}$ and $Al_V$, which corresponds to area 1, and between 20 and −100 ppm for $Al_{VI}$, which corresponds to area 2. In the following disclosure of the invention, the proportion of octahedral $Al_{VI}$ is defined as the following ratio: area 2/(area 1+area 2).

The silicon environment of the silica-aluminas is studied by the NMR of $^{29}Si$. The chemical displacement tables based on the degree of condensation were derived from the work of G. Engelhardt and D. Michel: "High Resolution Solid-State NMR of Silicates and Zeolites" (Wiley), 1987.

NMR 29 Si shows the chemical displacements of different silicon radicals such as $Q^4$ (−105 ppm to −120 ppm), $Q^3$ (−90 ppm to −102 ppm) and $Q^2$ (−75 ppm to −93 ppm). The sites with a chemical displacement at −102 ppm can be sites of type $Q^3$ or $Q^4$; we call them sites $Q^{3-4}$. The definitions of the sites are as follows:

Sites $Q^4$: Si linked to 4Si (or Al),
Sites $Q^3$: Si linked to 3 Si (or Al) and 1 OH,
Sites $Q^2$: Si linked to 2 Si (or Al) and 2 OH.

The silica-aluminas of the invention consist of silicon of types $Q^2$, $Q^3$, $Q^{3-4}$ and $Q^4$. Numerous radicals would be of type $Q^2$, approximately on the order of 10 to 80%, preferably 20 to 60%, and in a preferred manner 20 to 40%. The proportion of radicals $Q^3$ and $Q^{3-4}$ is also significant, approximately on the order of 5 to 50%, and preferably from 10 to 40% for the two radicals.

The environment of the silicons was studied by NMR CP MAS $^1H->^{29}Si$, (300 MHz, speed of rotation: 4000 Hz). In this case, only the silicon that is linked to OH bonds should correspond. The table of chemical displacements that are used is that of Kodakari et al., Langmuir, 14, 4623-4629, 1998. The assignments are as follows: −108 ppm (Q4), −99 ppm ($Q^3$/Q4 (1 Al)), −91 ppm (Q3/Q3(1Al)), −84 ppm (Q2/Q3(2Al), −78 ppm (Q2/Q3(3Al) and −73 ppm Q1/Q2 (3 Al).

The silica-aluminas of the invention come in the form of a superposition of several clusters. The primary peak of these clusters is generally located at −110 ppm.

A method of characterization of the substrates and catalysts according to the invention that can be used is transmission electron microscopy (MET). For this purpose, an electron microscope (such as Jeol 2010 or Philips Tecnai 20F, optionally with scanning) that is equipped with an energy dispersion spectrometer (EDS) for x-ray analysis (for example a Tracor or an Edax) is used. The EDS detector should make possible the detection of light elements. The combination of these two tools, TEM and EDS, makes it possible to combine the imagery and the local chemical analysis with a good spatial resolution.

For this type of analysis, the samples are finely ground in the dry state in a mortar; the powder is then included in the resin to produce ultrafine fractions with a thickness of about 70 nm. These fractions are collected on Cu grids that are covered by an amorphous carbon film with holes used as a substrate. They are then introduced into the microscope for observation and analysis under secondary vacuum. By imagery, the sample zones are then easily distinguished from the resin zones. A certain number of analyses, 10 at a minimum, preferably between 15 and 30, are then initiated on different zones of the industrial sample. The size of the electron beam for the analysis of the zones (determining approximately the size of the analyzed zones) is 50 nm of diameter at a maximum, preferably 20 nm, even more preferably 10, 5, 2 or 1 nm of diameter. In the scanned mode, the analyzed zone will be based on the size of the scanned zone and no longer on the size of the beam, which is generally reduced.

The semi-quantitative treatment of X spectra collected with the help of the EDS spectrometer makes it possible to obtain the relative concentration of A and Si (in atomic %) and the Si/Al ratio for each of the analyzed zones. It is then possible to calculate the $Si/Al_m$ mean and the standard deviation σ of this set of measurements.

In the non-limiting examples of the following disclosure of the invention, the 50 nm probe is the probe that is used to characterize the substrates and catalysts according to the invention, unless otherwise indicated.

The packing density (DRT) is measured in the manner that is described in the work "Applied Heterogeneous Catalysis" by J. F. Le Page, J. Cosyns, P. Courty, E. Freund, J.-P. Franck, Y. Jacquin, B. Juguin, C. Marcilly, G. Martino, J. Miguel, R. Montarnal, A. Sugier, H. Van Landeghem, Technip. Paris, 1987. A graduated cylinder with acceptable dimensions is filled with catalyst by successive additions, and between each addition, the catalyst is packed by shaking the cylinder until a constant volume is achieved. This measurement is generally carried out on 1000 $cm^3$ of catalyst packed into a cylinder whose height to diameter ratio is close to 5:1. This measurement can preferably be carried out on automated devices such as Autotap® that is marketed by Quantachrome®.

The acidity of the matrix is measured by infra-red (IR) spectrometry. The IR spectra are recorded on a Nicolet interferometer such as Nexus-670 under a resolution of 4 $cm^{-1}$ with a Happ-Genzel-type apodization. The sample (20 mg) is pressed in the form of a self-supported pellet, then is placed in an in-situ analysis cell (25° C. to 550° C., furnace offset from the IR beam, secondary vacuum of $10^{-6}$ mbar). The diameter of the pellet is 16 mm.

The sample is pretreated in the following way to eliminate the physisorbed water and to dehydroxylate partially the surface of the catalyst to obtain a representative image of the acidity of the catalyst in use:

increase in temperature from 25° C. to 300° C. in 3 hours
plateau of 10 hours at 300° C.
drop in temperature from 300° C. to 25° C. in 3 hours.

The basic probe (pyridine) is then adsorbed with saturating pressure at 25° C. and then thermo-desorbed according to the following stages:

25° C. for 2 hours under secondary vacuum
100° C. for 1 hour under secondary vacuum
200° C. for 1 hour under secondary vacuum
300° C. for 1 hour under secondary vacuum.

A spectrum is recorded at 25° C. at the end of the pretreatment and at each desorption stage in transmission mode with an accumulation time of 100 s. The spectra are set to iso-mass (i.e., assumed to be at iso-thickness) (20 mg exactly). The number of Lewis sites is proportional to the surface area of the peak whose maximum lies around 1450 $cm^{-1}$, including any shoulder. The number of Bronsted sites is proportional to the surface area of the peak whose maximum lies around 1545 $cm^{-1}$. The ratio of the number of Bronsted sites/number of Lewis sites (B/L) is estimated to be equal to the ratio of the surface areas of two peaks described above. The surface area of peaks at 25° C. is generally used. This B/L ratio is generally calculated from the spectrum that is recorded at 25° C. at the end of the pretreatment.

When a dopant, P and/or B and/or Si, is introduced, its distribution and its location can be determined by techniques such as the Castaing microprobe (distribution profile of various elements), the transmission electron microscopy coupled to an X analysis of the components of catalysts, or else by establishing a distribution cartography of the elements that are present in the catalyst by electron microprobe. These techniques make it possible to demonstrate the presence of these exogenous elements that are added after the synthesis of the silica-alumina according to the invention.

The overall composition of the catalyst can be determined by X fluorescence on the catalyst in the powdered state or by atomic absorption after acid attack of the catalyst.

The measurement of the local composition on the micron scale, in contrast to the overall composition of the catalyst, can be carried out by electron microprobe. This measurement can be carried out by determining the metal contents in zones of several cubic microns along the diameter of a particle of catalysts that are called measurement units. This measurement makes it possible to evaluate the macroscopic distribution of elements inside particles. It can optionally be completed on the nanometer scale by STEM (Scanning Transmission Electron Microscopy).

The analyses are conducted on an electron microprobe CAMECA SX100 (equipped with 5 spectrometers with wavelength dispersion) (preferred device) or optionally on JEOL 8800R (4 spectrometers). The acquisition parameters are as follows: extraction voltage 20 kV, current 80 or 200 nA and counting time 10 s or 20 s according to the concentration level. The particles are coated in the resin then polished as far as their diameter.

It will be noted that the name diameter does not refer only to one ball or extrudate shape but more generally to any shape of particles; actually, the representative length of the particle on which the measurement is carried out is named diameter.

The measurements are carried out on a representative sample of the bed or the lot of the catalyst that will be used on a catalytic bed. It was envisioned that the analyses should be done on at least 5 particles with at least 30 measurements per particle, uniformly distributed along the diameter.

CMo, CNi, CW and CP are called the local concentrations (expressed in %) respectively of molybdenum, nickel, tungsten and phosphorus.

It would be equally possible to express the concentrations in atomic %, whereby the relative fluctuations are the same.

It is advantageous to prepare catalysts that have homogeneous concentrations of CMo, CNi, CW and CP along the extrudate. It is also advantageous to prepare catalysts that exhibit concentrations of CMo, CNi, CW and CP in the core and on a different periphery. These catalysts exhibit distribution profiles called "bowls" or "domes." Another type of distribution is that in a crust where the elements of the active phase are distributed on the surface.

DETAILED DESCRIPTION OF THE INVENTION

More specifically, the invention relates to a catalyst that comprises:
  at least one hydro-dehydrogenating element that is selected from the group that is formed by the elements of group VIB and group VIII of the periodic table,
  0.01 to 5.5% of a dopant that is selected from among phosphorus, boron and silicon, preferably boron or phosphorus and more preferably phosphorus,
  and a non-zeolitic substrate with a silica-alumina base that contains a quantity of more than 15% by weight and less than or equal to 95% by weight of silica ($SiO_2$), whereby said catalyst exhibits the following characteristics:
  a mean pore diameter, measured by mercury porosimetry, of between 20 and 140 Å,
  a total pore volume, measured by mercury porosimetry, of between 0.1 ml/g and 0.5 ml/g, preferably of less than 0.45 ml/g and more preferably of less than 0.4 ml/g,
  a total pore volume, measured by nitrogen porosimetry, of between 0.1 ml/g and 0.5 ml/g, preferably of less than 0.45 ml/g and more preferably of less than 0.4 ml/g,
  a BET specific surface area of between 100 and 550 $m^2/g$, preferably of between 150 and 500 $m^2/g$, preferably of less than 350 $m^2/g$, and even more preferably of less than 250 $m^2/g$,
  a pore volume, measured by mercury porosimetry, encompassed in the pores with a diameter of more than 140 Å, of less than 0.1 ml/g,
  a pore volume, measured by mercury porosimetry, encompassed in the pores with a diameter of more than 160 Å, of less than 0.1 ml/g,
  a pore volume, measured by mercury porosimetry, encompassed in the pores with a diameter of more than 200 Å, of less than 0.1 ml/g, preferably of less than 0.075 ml/g, and more preferably of less than 0.05 ml/g,
  a pore volume, measured by mercury porosimetry, encompassed in the pores with a diameter of more than 500 Å, of more than 0.01 ml/g and of less than 0.09 ml/g, preferably of more than 0.01 ml/g and of less than 0.05 ml/g, and more preferably of more than 0.01 ml/g and of less than 0.02 ml/g,
  an X diffraction diagram that contains at least the main lines that are characteristic of at least one of the transition aluminas contained in the group that consists of the alpha-, rho-, chi-, eta-, gamma-, kappa-, theta- and delta-aluminas,
  a packing density of catalysts of more than 0.75 $g/cm^3$, preferably of more than 0.85 $g/cm^3$, very preferably of more than 0.95 $cm^3/g$, and even more preferably of more than 1.05 $g/cm^3$.

The invention also relates to a hydrocracking/hydroconversion process and a process for hydrotreatment of hydrocarbon feedstocks with said catalysts.

Characteristics of the Substrate of the Catalyst According to the Invention

The silica-alumina that is used in the catalyst according to the invention is preferably a silica-alumina that is homogeneous on the micrometer scale and in which the content of cationic impurities (for example $Na^+$) is less than 0.1% by weight, preferably less than 0.05% by weight, and even more preferably less than 0.025% by weight, and the content of anionic impurities (for example $SO_4^{2-}$, $Cl^-$) is less than 1% by weight, preferably less than 0.5% by weight, and even more preferably less than 0.1% by weight.

Thus, any silica-alumina synthesis process that is known to one skilled in the art that leads to a silica-alumina that is homogenous on the micrometer scale and in which the cationic impurities (for example $Na^+$) can be reduced to less than 0.1%, preferably to a content of less than 0.05% by weight, and even more preferably less than 0.025% by weight, and in which the anionic impurities (for example $SO_4^{2-}$, $Cl^-$) can be reduced to less than 1% and more preferably to a content of less than 0.05% by weight, is suitable for preparing the substrates that are the object of the invention.

The substrate of the catalyst according to the invention is a non-zeolitic substrate with a silica-alumina base (i.e., comprising alumina and silica) with a content by mass of silica ($SiO_2$) of more than 15% by weight and less than or equal to 95% by weight, preferably a silica content of more than 20% by weight and of less than 80% by weight, and even more preferably of more than 25% by weight and of less than 75% by weight.

Thus, the increase of the silica content to a value of more than 15% by weight makes possible the increase of the acidity of the substrate with a silica-alumina base and therefore the increase of the isomerizing activity. Actually, by hydroconversion and more particularly by hydrocracking, the conversion of the hydrocarbon molecules is done on the acid sites. The interfaces between the silica and the alumina are at the source of the acidity of the silica-aluminas. The active site is actually the proton of the hydroxyl that provides a bridge between the silicon and the aluminum. The overall acidity therefore depends on the number of proton sites. It increases with the silica content because the overall surface area of the silica-alumina interfaces increases. This acidity can be measured by the model molecule test that is described in the text. With 10% silica, the isomerizing activity is 0.05; it is 0.12 at 30% and 0.15 at 40% by weight of silica.

The environment of the silicon of the silica-aluminas is studied by the NMR of $^{29}$Si. The silica-aluminas of the invention are composed of silicon of types $Q^2$, $Q^3$, $Q^{3-4}$ and $Q^4$. Many radicals are of type $Q^2$, approximately on the order of 10 to 80%, preferably 20 to 60%, and preferably 20 to 40%. The proportion of the radicals $Q^3$ and $Q^{3-4}$ is also significant, approximately on the order of 5 to 50% and preferably 10 to 40% for the two radicals.

The environment of the silicons was studied by NMR CP MAS $^1$H->$^{29}$Si (300 MHz, speed of rotation: 4000 Hz). In this case, only the silicon that is linked to OH bonds has to correspond. The table of chemical displacements that are used is that of Kodakari et al., Langmuir, 14, 4623-4629, 1998. The assignments are as follows: −108 ppm (Q4), −99 ppm (Q3/Q4(1 Al)), −92 ppm (Q3/Q3(1Al)), −84 ppm (Q2/Q3(2Al), −78 ppm (Q2/Q3(3Al) and −73 ppm Q1/Q2 (3 Al).

The silica-aluminas of the invention generally come in the form of a superposition of several clusters. The primary peak of these clusters is advantageously located at −110 ppm.

The NMR MAS spectra of the solid of $^{27}$Al of the substrates and catalysts according to the invention show two clusters of separate peaks. A first type of aluminum whose maxima resonate toward 10 ppm extends between −100 and 20 ppm. The position of the maximum suggests that these radicals are essentially of $Al_{VI}$ type (octahedral). A second type of minority aluminum whose maxima resonate toward 60 ppm extends between 20 and 110 ppm. This cluster can be broken down into at least two radicals. The predominant radical of this cluster would correspond to $Al_{IV}$ atoms (tetrahedral). For the substrates and catalysts of this invention, advantageously, the proportion of octahedral $Al_{VI}$ is greater than 50%, preferably greater than 60%, and even more preferably greater than 70%.

In an embodiment of the invention, the catalyst contains a substrate that comprises at least two aluminosilicate zones, whereby said zones have Si/Al ratios that are less than or greater than the overall Si/Al ratio determined by X fluorescence. Thus, a substrate that has an Si/Al ratio that is equal to 0.5 comprises, for example, two aluminosilicate zones: one of the zones has a TEM-determined Si/Al ratio of less than 0.5 and the other zone has a TEM-determined Si/Al ratio of between 0.5 and 2.5.

In another embodiment of the invention, the catalyst contains a substrate that comprises a single silica-alumina zone, whereby said zone has an Si/Al ratio that is equal to the overall Si/Al ratio that is determined by X-fluorescence and that is less than 2.3.

The acidity of the catalyst substrate according to the invention can advantageously be measured, without this restricting the scope of the invention, by IR tracking of the thermodesorption of the pyridine. Generally, the B/L ratio, as described above, of the substrate according to the invention is between 0.05 and 1, preferably between 0.05 and 0.7, very preferably between 0.05 and 0.5.

Characteristics of the Catalyst According to the Invention

The catalyst according to the invention therefore comprises:

A non-zeolitic substrate with a silica-alumina base (i.e., comprising alumina and silica) with a content by mass of silica ($SiO_2$) of more than 15% by weight and less than or equal to 95% by weight, preferably a silica content of more than 20% by weight and of less than 80% by weight, and even more preferably of more than 25% by weight and of less than 75% by weight, Preferably a cationic impurity content of less than 0.1% by weight, preferably of less than 0.05% by weight, and even more preferably of less than 0.025% by weight. The cationic impurity content is defined as the total alkaline content, Preferably an anionic impurity content of less than 1% by weight, preferably of less than 0.5% by weight, and even more preferably of less than 0.1% by weight, At least one hydro-dehydrogenating element that is selected from the group that is formed by the elements of group VIB and group VIII of the periodic table, Preferably a content by mass of metal(s) of group VIB, in metallic form or in oxide form of between 1 and 50% by weight, preferably between 1.5 and 35%, and even more preferably between 1.5 and 30%, Preferably a content by mass of metals of group VIII, in metallic form or in oxide form of between 0.1 and 30% by weight, preferably between 0.2 and 25% and even more preferably between 0.2 and 20%, At least one dopant that is deposited on the catalyst (dopant is defined as an element that is introduced after the preparation of the aluminosilicate substrate that is described above) and selected from the group that is formed by phosphorus, boron and silicon, preferably phosphorus and/or boron and even more preferably phosphorus. The contents by mass of phosphorus, boron, and silicon, calculated in their oxide form, are encompassed between 0.01 and 5.5%, preferably between 0.1 and 4%, more preferably between 0.2 and 2.5%, and even more preferably between 0.2 and 1%.

Optionally at least one element of group VIIB (manganese, for example and preferably) and a content by weight encompassed between 0 and 20%, preferably between 0 and 10% of the compound in oxide or metal form.

Optionally at least one element of group VB (niobium, for example and preferably), and a content by weight encompassed between 0 and 40%, preferably between 0 and 20% of the compound in oxide or metal form.

A mean pore diameter, measured by mercury porosimetry, encompassed between 20 and 140 Å, preferably between 40 and 120 Å, and even more preferably between 50 and 100 Å, Preferably a ratio between volume V2, measured by mercury porosimetry, encompassed between $D_{mean}$−30 Å and $D_{mean}$+30 Å, to the total pore volume that is also measured by mercury porosimetry of more than 0.6, preferably of more than 0.7, and even more preferably of more than 0.8.

Preferably a volume V3 encompassed in the pores with diameters of more than $D_{mean}$+30 Å, measured by mercury porosimetry, of less than 0.1 ml/g, preferably of less than 0.06 ml/g, and even more preferably of less than 0.04 ml/g.

Preferably a ratio between volume V5 encompassed between $D_{mean}$−15 Å and $D_{mean}$+15 Å, measured by mercury porosimetry, and volume V2 encompassed between $D_{mean}$−30 Å and $D_{mean}$+30 Å, measured by mercury porosimetry, of more than 0.6, preferably of more than 0.7, and even more preferably of more than 0.8.

Preferably a volume V6 encompassed in the pores with diameters of more than $D_{mean}+15$ Å, measured by mercury porosimetry, of less than 0.2 ml/g, preferably of less than 0.1 ml/g, and even more preferably of less than 0.05 ml/g.

A total pore volume, measured by mercury porosimetry, encompassed between 0.1 ml/g and 0.5 ml/g, preferably of less than 0.45 ml/g and more preferably of less than 0.4 ml/g.

A total pore volume, measured by nitrogen porosimetry, encompassed between 0.1 ml/g and 0.5 ml/g, preferably of less than 0.45 ml/g and more preferably of less than 0.4 ml/g, A BET specific surface area encompassed between 100 and 550 m$^2$/g, preferably encompassed between 150 and 500 m$^2$/g, preferably of less than 350 m$^2$/g, and even more preferably of less than 250 m$^2$/g.

Preferably an adsorption surface area such that the ratio between the adsorption surface area and the BET surface area is more than 0.5, preferably more than 0.65, and more preferably more than 0.8, A pore volume, measured by mercury porosimetry, encompassed in the pores with a diameter of more than 140 Å, of less than 0.1 ml/g, preferably of less than 0.05 ml/g, and even more preferably of less than 0.03 ml/g.

A pore volume, measured by mercury porosimetry, encompassed in the pores with a diameter of more than 160 Å, of less than 0.1 ml/g, preferably of less than 0.05 ml/g, and even more preferably of less than 0.025 ml/g.

A pore volume, measured by mercury porosimetry, encompassed in the pores with a diameter of more than 200 Å, of less than 0.1 ml/g, preferably of less than 0.075 ml/g, and more preferably of less than 0.05 ml/g.

A pore volume, measured by mercury porosimetry, encompassed in the pores with a diameter of more than 500 Å, of more than 0.01 ml/g, and of less than 0.09 ml/g, preferably of more than 0.01 ml/g and of less than 0.05 ml/g, and more preferably of more than 0.01 ml/g and of less than 0.02 ml/g.

An X diffraction diagram that contains at least the primary lines that are characteristic of at least one of the transition aluminas encompassed in the group that consists of the rho-, chi-, kappa-, eta-, gamma-, theta- and delta-aluminas, preferably that contains at least the primary lines that are characteristic of at least one of the transition aluminas that are encompassed in the group that consists of the gamma-, eta-, theta- and delta-aluminas, and more preferably that contains at least the primary lines that are characteristic of the gamma- and eta-aluminas, and even more preferably that contains the peaks at a d that is encompassed between 1.39 to 1.40 Å and at a d that is encompassed between 1.97 Å to 2.00 Å.

A packing density of catalysts of more than 0.75 g/cm$^3$, preferably of more than 0.85 g/cm$^3$, very preferably of more than 0.95 cm$^3$/g, and even more preferably of more than 1.05 g/cm$^3$.

When the dopant is phosphorus, the phosphorus content is advantageously encompassed between 0.01 and 4% by weight of oxide, very preferably between 0.01 and 2.5% by weight of oxide.

The catalyst preferably has a base of molybdenum and tungsten and/or nickel and tungsten.

A preferred catalyst according to the invention comprises the nickel-tungsten combination and a phosphorus content encompassed between 0.01 and 4% by weight of oxide.

A very preferred catalyst according to the invention comprises the nickel-tungsten combination and a phosphorus content encompassed between 0.01 and 2.5% by weight of oxide.

The catalyst can also contain a minor proportion of at least one stabilizing element that is selected from the group that is formed by zirconium and titanium.

The catalyst according to the invention does not contain fluorine.

Standard Activity Test: Evaluation of Catalysts According to the Invention

The acidity and the hydrogenation performance level of the catalysts according to the invention can be evaluated by a catalytic test of a mixture of model molecules: the hydrogenation of toluene and the isomerization of cyclohexane.

The catalytic test that makes it possible to monitor the hydrogenation and the acidity of the catalysts is carried out according to the following operating procedure:

The catalysts are sulfurized in situ under dynamic conditions in a tubular fixed-bed reactor that is traversed by a Catatest-type pilot unit (manufacturer Vinci Technologies), whereby the fluids circulate from top to bottom. The measurements of hydrogenating and isomerizing activity are carried out immediately after pressurized sulfurization without returning to air with the hydrocarbon feedstock that was used to sulfurize the catalysts.

The sulfurization and test feedstock consists of 5.8% of dimethyl disulfide (DMDS), 20% of toluene and 74.2% of cyclohexane by weight. The stabilized catalytic activities of equal volumes of catalysts are thus measured in the hydrogenation reaction of toluene. The tracking of the isomerization of the cyclohexane, toluene diluent, makes it possible to estimate the acidity of the catalysts.

The conditions of measuring activity are as follows (by taking into consideration a total evaporation and the ideal gas law):

| | |
|---|---|
| Total pressure: | 6.0 MPa |
| Pressure of toluene: | 0.38 MPa |
| Pressure of cyclohexane: | 1.55 MPa |
| Pressure of hydrogen: | 3.64 MPa |
| Pressure of H$_2$S: | 0.22 MPa |
| Volume of catalyst: | 40 cc |
| Feedstock flow rate: | 80 cc/h |
| Hourly volumetric flow rate: | 2 l/l/h$^{-1}$ |
| Hydrogen flow rate: | 36 l/h |
| Sulfurization and test temperature: | 350° C. (3° C./min). |

Samplings of the liquid effluent are analyzed by gas phase chromatography. The determination of molar concentrations of unconverted toluene (T) and concentrations of hydrogenation products: methyl cyclohexane (MCC6), ethyl cyclopentane (EtCC5) and dimethyl cyclopentane (DMCC5) make it possible to calculate a hydrogenation level of toluene $X_{HYD}$ that is defined by:

$$X_{HYD}(\%)=100*(MCC6+EtCC5+DMCC5)/(T+MCC6+EtCC5+DMCC5)$$

The isomerization level of cyclohexane $X_{ISO}$ is calculated in the same way from unconverted cyclohexane concentrations and its reaction product, methyl cyclopentane. The reaction for hydrogenation of toluene and isomerization of cyclohexane being on the order of 1 in our test conditions and the reactor acting as an ideal piston reactor, the hydrogenating activity $A_{HYD}$ and isomerizing activity $A_{ISO}$ of the catalysts are calculated by applying the formula: $A_i = \ln(100/(100-X_i))$.

Advantageously, in the standard activity test, the catalyst according to the invention has an activity $A_{HYD} > 0.7$ and an activity $A_{ISOM} > 0.1$, preferably $A_{HYD} > 0.9$ and $A_{ISOM} > 0.12$, more preferably $A_{HYD} > 1.2$ and $A_{ISOM} > 0.13$, and even more preferably $A_{HYD} > 1.4$ and $A_{ISOM} > 0.13$.

The ratio of hydrogenating activity to isomerizing activity H/A is equal to $A_{HYD}/A_{ISO}$.

The ratio of hydrogenating activity to isomerizing activity H/A is advantageously encompassed between 6.5 and 30, preferably between 7 and 30, very preferably between 7.25 and 25, more preferably between 8.2 and 20, and even more preferably between 9.5 and 15.

Processes of Preparation

The catalysts according to the invention can be prepared according to all of the methods that are well known to one skilled in the art.

A preferred process for preparation of the catalyst according to this invention comprises the following stages:

According to a preferred preparation method, the precursor is obtained by direct shaping of the silica-alumina by itself or by shaping the silica-alumina with at least one binder, then drying and calcination. The elements of groups VIB and/or VIII, and optionally those selected from among phosphorus, boron, silicon and optionally the elements of groups VB and VIIB, are then optionally introduced by any method that is known to one skilled in the art, before or after the shaping and before or after the calcination of the precursor or the catalyst.

The hydrogenating element can be introduced at any stage of the preparation, preferably during the mixing, or very preferably after shaping. The shaping is followed by a calcination; the hydrogenating element can also be introduced before or after this calcination. The preparation generally ends by a calcination at a temperature of 250 to 600° C. Another of the preferred methods according to this invention consists in shaping the silica-alumina without a binder after the latter is mixed, then passage of the thus obtained paste through a die to form extrudates with a diameter of between 0.4 and 4 mm. The hydrogenating function can then be introduced in part only (a case of, for example, combinations of metal oxides of groups VIB and VIII) or completely, at the time of mixing. It can also be introduced by one or more ion exchange operations on the calcined substrate that consists of at least one silica-alumina, optionally shaped with a binder, with solutions that contain the precursor salts of the metals selected when the latter belong to group VIII. It can also be introduced by one or more operations for impregnation of the shaped and calcined substrate, by a solution of the metal oxide precursors of groups VIII (in particular cobalt and nickel) when the precursors of the metal oxides of group VIB (in particular molybdenum or tungsten) were previously introduced at the time of mixing of the substrate. It can also finally be introduced, very preferably by one or more operations for impregnation of the calcined substrate that consists of at least one silica-alumina according to the invention and optionally at least one binder, by solutions that contain the precursors of the metal oxides of groups VI and/or VIII, whereby the precursors of the metal oxides of group VIII are preferably introduced after those of group VIB or at the same time as the latter.

The substrate is preferably impregnated by an aqueous solution. The impregnation of the substrate is preferably carried out by the so-called "dry" impregnation method that is well known to one skilled in the art. The impregnation can be carried out in a single stage by a solution that contains all of the constituent elements of the final catalyst.

The catalyst of this invention can therefore contain at least one element of group VIII such as iron, cobalt, nickel, ruthenium, rhodium, palladium, osmium, iridium or platinum. Among the metals of group VIII, it is preferred to use a metal that is selected from the group that is formed by iron, cobalt, nickel, platinum, palladium and ruthenium. The catalyst according to the invention can also contain at least one element of group VIB, preferably tungsten and molybdenum. The following combinations of metals are advantageously used: nickel-molybdenum, cobalt-molybdenum, iron-molybdenum, iron-tungsten, nickel-tungsten, cobalt-tungsten, platinum-palladium; the preferred combinations are: nickel-molybdenum, cobalt-molybdenum, cobalt-tungsten and even more advantageously platinum-palladium and nickel-tungsten. It is also possible to use combinations of three metals, for example nickel-cobalt-molybdenum, nickel-molybdenum-tungsten, or nickel-cobalt-tungsten. The following combinations of metals are advantageously used: nickel-niobium-molybdenum, cobalt-niobium-molybdenum, iron-niobium-molybdenum, nickel-niobium-tungsten, cobalt-niobium-tungsten, iron-niobium-tungsten, whereby the preferred combinations are: nickel-niobium-molybdenum, cobalt-niobium-molybdenum. It is also possible to use combinations of four metals, for example nickel-cobalt-niobium-molybdenum. It is also possible to use combinations that contain a noble metal, such as ruthenium-niobium-molybdenum, or else ruthenium-nickel-niobium-molybdenum.

At least one of the following elements: phosphorus and/or boron and/or silicon, and optionally the element (s) selected from group(s) VIIB and VB, is introduced into the catalyst at any level of the preparation and according to any technique that is known to one skilled in the art.

A preferred method according to the invention consists in depositing the selected dopant or dopants, for example the boron-silicon pair, on the precursor that may or may not be calcined, preferably calcined. For this purpose, an aqueous solution is prepared with at least one boron salt such as ammonium biborate or ammonium pentaborate in an alkaline medium and in the presence of hydrogen peroxide, and a so-called dry impregnation is initiated, in which the volume of the pores of the precursor is filled by the solution that contains, for example, boron. In the case where, for example, silicon is also deposited, a solution of a silicone-type silicon compound or a silicone oil emulsion will be used.

The deposition of boron and silicon can also be carried out simultaneously by using, for example, a solution that contains a boron salt and a silicone-type silicon compound. Thus, for example, in the case where the precursor is a nickel-tungsten-type catalyst that is supported on silica-alumina, it is possible to impregnate this precursor by the aqueous solution of ammonium biborate and Rhodorsil E1P silicone of the Rhodia Company to initiate drying at, for example, 120° C., then to impregnate by an ammonium fluoride solution, to initiate drying at, for example 120° C., and to initiate calcination for example and preferably in air in a flow-through bed, for example at 500° C. for 4 hours.

The dopant that is selected from the group that is formed by phosphorus, silicon, and boron as well as the elements of groups VIIB, VB can be introduced by one or more impregnation operations with excess solution on the calcined precursor.

When at least one dopant, P and/or B and/or Si, is introduced, its distribution and its location can be determined by techniques such as the Castaing microprobe (distribution profile of various elements), transmission electron microscopy, combined with an X analysis of the components of the catalysts, or else by establishing distribution mapping of elements that are present in the catalyst by electron microprobe. These techniques make it possible to demonstrate the presence of these exogenous elements that are added after the synthesis of the silica-alumina according to the invention.

It is advantageous to prepare catalysts that have homogeneous concentrations of $C_{MO}$, $C_{NI}$, $C_W$ and $C_P$ along the extrudate. It is also advantageous to prepare catalysts that exhibit concentrations of $C_{MO}$, $C_{NI}$, $C_W$ and $C_P$ in the core and on a different periphery. These catalysts exhibit distribution profiles called "bowls" or "domes." Another type of distribution is that in a crust where the elements of the active phase are distributed on the surface.

In a general way, the core/edge ratio of concentrations $C_{MO}$, $C_{NI}$, $C_W$ and $C_P$ is encompassed between 0.1 and 3. In a variant of the invention, it is encompassed between 0.8 and 1.2. In another variant of the invention, the core/edge ratio of concentrations $C_P$ is encompassed between 0.3 and 0.8.

The preferred phosphorus source is orthophosphoric acid $H_3PO_4$, but its salts and esters such as the ammonium phosphates are also suitable. The phosphorus can, for example, be introduced in the form of a mixture of phosphoric acid and a basic organic compound that contains nitrogen, such as ammonia, primary and secondary amines, cyclic amines, the compounds of the family of pyridine and quinolines and the compounds of the pyrrole family. The tungsto-phosphoric or tungsto-molybdic acids can be used.

The phosphorus content is adjusted without this limiting the scope of the invention, so as to form a mixed compound in solution and/or on the substrate, for example tungsten-phosphorus or molybdenum-tungsten-phosphorus. These mixed compounds can be heteropolyanions. These compounds can be Anderson heteropolyanions, for example. The content by mass of phosphorus calculated in the $P_2O_5$ form is encompassed between 0.01 and 5.5%, preferably between 0.01 and 4%, very preferably between 0.01 and 2.5%, more preferably between 0.2 and 2%.

The boron source can be boric acid, preferably orthoboric acid $H_3BO_3$, ammonium biborate or pentaborate, boron oxide, boric esters. Boron can be introduced, for example, in the form of a mixture of boric acid, hydrogen peroxide, and a basic organic compound that contains nitrogen, such as ammonia, primary and secondary amines, cyclic amines, compounds of the family of pyridine and quinolines, and the compounds of the pyrrole family. Boron can be introduced by, for example, a solution of boric acid in a water/alcohol mixture.

Many sources of silicon can be used. Thus, it is possible to use ethyl orthosilicate $Si(OEt)_4$, siloxanes, polysiloxanes, silicones, silicone emulsions, silicates of halides such as ammonium fluorosilicate $(NH_4)_2SiF_6$ or sodium fluorosilicate $Na_2SiF_6$. Silicomolybdic acid and its salts, silicotungstic acid and its salts can also be advantageously used. The silicon can be added, for example, by impregnation of ethyl silicate in solution in a water/alcohol mixture. The silicon can be added, for example, by impregnation of a silicone-type silicon compound or silicic acid that is suspended in water.

The metals of group VIB and group VIII of the catalyst of this invention can be present completely or partially in metallic form and/or oxide form and/or sulfide form.

For example, among the sources of molybdenum and tungsten, it is possible to use oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts.

The sources of elements of group VIII that can be used are well known to one skilled in the art. For example, for non-noble metals, nitrates, sulfates, hydroxides, phosphates; halides, for example chlorides, bromides and fluorides; and carboxylates, for example acetates and carbonates, will be used. For noble metals, halides, for example chlorides, nitrates, acids, such as chloroplatinic acid; and oxychlorides such as ammoniacal ruthenium oxychloride will be used.

Preferably, halogens other than the one introduced in the impregnation, this halogen preferably being chlorine, are not added.

Preparation of the Substrate

The applicant discovered that the aluminosilicate substrates obtained starting from a mixture at any arbitrary stage of an alumina compound that is partially soluble in acid medium shaped with a totally soluble silica compound or with a totally soluble combination of hydrated alumina and silica, followed by a hydrothermal or thermal treatment so as to homogenize on the micrometer scale, and even on the nanometer scale, would make it possible to obtain a particularly active catalyst in the hydrocracking processes. Partially soluble in acid medium is defined by the applicant as bringing the alumina compound into contact before any addition of totally soluble silica compound or the combination with an acid solution, for example, nitric acid or sulfuric acid, causes partial dissolution thereof.

In another embodiment, it is possible to obtain substrates according to the invention by using dried or hydrated silica powder.

Silica Sources

The silica compounds that are used according to the invention may have been selected from the group that is formed by silicic acid, silicic acid sols, water-soluble alkaline silicates, cationic silicon salts, for example the hydrated sodium metasilicate, Ludox® in ammonia form or in alkaline form, and quaternary ammonium silicates. The silica sol can be prepared according to one of the methods that are known to one skilled in the art. A decationized orthosilicic acid solution is preferably prepared starting from a water-soluble alkaline silicate by ion exchange on a resin. In another embodiment, the silica sols Nyacol® or Nyacol® Nano Technologies can be used. In another embodiment, the silica powders Aerosil® or Nyasil® can be used.

Totally Soluble Silica-Alumina Sources

The totally soluble hydrated silica-aluminas that are used according to the invention can be prepared by true co-precipitation under controlled stationary operating conditions (pH, concentration, temperature, average dwell time) by reaction of a basic solution that contains silicon, for example in sodium silicate form, optionally aluminum, for example, in sodium aluminate form with an acid solution that contains at least one aluminum salt, for example aluminum sulfate. At least one carbonate or else $CO_2$ optionally can be added to the reaction medium.

The applicant defines true co-precipitation as a process by which at least one aluminum compound that is totally soluble in basic medium or acid medium as described below, and at least one silicon compound as described below are brought into contact, simultaneously or sequentially, in the presence of at least one precipitating and/or co-precipitating compound so as to obtain a mixed phase that essentially consists of hydrated silica-alumina that is optionally homogenized by intense stirring, shearing, colloidal grinding or else by a combination of these unitary operations. For example, these hydrated silica-aluminas may have been prepared according to the teachings of U.S. Pat. Nos. 2,908,635; 3,423,332, 3,433,747, 3,451,947, 3,629,152, and 3,650,988.

The total dissolution of the silica compound or the combination was evaluated approximately according to the following method. A fixed quantity (15 g) of the silica compound or the hydrated combination is introduced into a preset pH medium. The concentration of solid added per liter of suspension is preferably 0.2 mol per liter. The pH of the dispersion solution is at least 12, and it can be obtained by use of an alkaline source. It is preferably advantageous to use NaOH. The mixture is then stirred mechanically by a deflocculant-type turbine stirring mechanism for 30 minutes at 800 rpm. Once the stirring is ended, the mixture is centrifuged for 10 minutes at 3000 rpm. The cake is separated from the supernatant liquid. The solution was filtered on a filter with a porosity of 4 and a diameter of 19 cm. The drying and then the calcination are then initiated at 1000° C. of the two fractions. Then, an equal ratio R is defined by dividing the decanted mass by the mass of the solid in suspension. Totally soluble is defined as a ratio R that is at least higher than 0.9.

Alumina Sources

The alumina compounds that are used according to the invention are partially soluble in acid medium. They are selected completely or partially from the group of alumina compounds of general formula $Al_2O_3$, $nH_2O$. It is possible in particular to use hydrated alumina compounds such as: hydrargillite, gibbsite, bayerite, boehmite, pseudo-boehmite, and amorphous or essentially amorphous alumina gels. It is also possible to use the dehydrated forms of these compounds that consist of transition aluminas and that comprise at least one of the phases that is included in the group: rho, chi, eta, gamma, kappa, theta, and delta, which differ essentially by the organization of their crystalline structure. The alpha-alumina that is commonly called corundum can be incorporated in a small proportion in the substrate according to the invention.

This partial dissolution property is a desired property of the invention; it applies to hydrated alumina powders, to sprayed hydrated alumina powders, to dispersions or suspensions of hydrated alumina or to any combination thereof, before any addition of a compound that contains some or all of the silicon.

The partial dissolution of the alumina compound was evaluated approximately according to the following method. A specific quantity of the alumina compound in powdered or suspension form is introduced into a preset pH medium. The mixture is then stirred mechanically. Once the stirring is ended, the mixture is left without stirring for 24 hours. Preferably, the $Al_2O_3$ solid concentration that is added per liter of suspension is 0.5 mol per liter. The pH of the dispersion solution is 2 and is obtained either by use of $HNO_3$, or of HCl, or of $HClO_4$. Preferably, it is advantageous to use $HNO_3$. The distribution of sedimented and dissolved fractions was followed by metering of aluminum by UV absorption. The supernatants were ultrafiltered (polyether sulfone membrane, Millipore NMWL: 30,000) and digested in concentrated acid. The quantity of aluminum in the supernatant corresponds to the non-sedimented alumina compound and the dissolved aluminum and the fraction that is ultrafiltered with dissolved aluminum only. The quantity of sedimented particles is derived from the theoretical concentration of aluminum in the dispersion (by taking into consideration that all of the solid that is introduced is dispersed) and quantities of boehmite that are actually dispersed and aluminum in solution.

The alumina precursors that are used according to this invention are therefore distinguished from those that are used in the case of true co-precipitations that are entirely soluble in acid medium: cationic alumina salts, for example aluminum nitrate. The methods that are part of the invention are distinguished from true co-precipitations because one of the elements, in this case the aluminum compound, is partially soluble.

To use the alumina, any alumina compound of general formula $Al_2O_3$, $nH_2O$ can be used. Its specific surface area is between 150 and 600 $m^2/g$. It is possible in particular to use hydrated alumina compounds, such as: hydrargillite, gibbsite, bayerite, boehmite, pseudo-boehmite and amorphous or essentially amorphous alumina gels. It is also possible to use the dehydrated forms of these compounds that consist of transition aluminas and that comprise at least one of the phases that is included in the group: rho, chi, eta, gamma, kappa, theta, delta and alpha, which differ essentially by the organization of their crystalline structure. During heat treatments, these different forms are liable to evolve among themselves, according to a complex relationship that depends on the treatment operating conditions. It is also possible to use the alpha-alumina that is commonly called corundum in measured proportions.

Aluminum hydrate $Al_2O_3$, $nH_2O$ that is used more preferably is boehmite, pseudo-boehmite and the amorphous or essentially amorphous alumina gels. A mixture of these products under any arbitrary combination can also be used.

Boehmite is generally described as an aluminum monohydrate of formula $Al_2O_3$, $nH_2O$ that in reality includes a broad continuum of materials with variable degrees of hydration and organization with more or less well-defined boundaries: the most hydrated gelatinous boehmite, with n able to be more than 2, the pseudo-boehmite or the microcrystalline boehmite with n encompassed between 1 and 2, then crystalline boehmite, and finally boehmite that is well crystallized with large crystals with n close to 1. The morphology of aluminum monohydrate can vary within broad limits between these two acicular or prismatic end forms. An entire set of variable forms can be used between these two forms: chain, boats, interlaced platelets.

The preparation and/or the shaping of the aluminum hydrate thus can constitute the first stage of the preparation of these catalysts. Many patents relate the preparation and/or the shaping of transition-alumina-based substrates that are obtained from aluminum monohydrate: U.S. Pat. Nos. 3,520, 654; 3,630,670; 3,864,461; 4,154,812; 4,313,923; DE 3,243, 193; and 4,371,513.

Relatively pure aluminum hydrates can be used in the form of amorphous or crystallized powder or crystallized powder containing an amorphous portion. The aluminum hydrate can also be introduced in the form of aqueous suspensions or dispersions. The aqueous suspensions or dispersions of aluminum hydrate that are used according to the invention may have the ability to gel or solidify. The aqueous dispersions or suspensions can also be obtained, as is well known to one skilled in the art, by peptization in water or water that is acidulated with aluminum hydrates. The dispersion of aluminum hydrate can be carried out by any process that is known to one skilled in the art: in a batch reactor, a continuous mixer, a mixing machine, or a colloidal mill. Such mixing can be also be carried out in a piston flow reactor and, in particular, in a static mixer. The Lightnin reactors can be cited.

In addition, as an alumina source, it is also possible to use an alumina that has been subjected in advance to a treatment that can improve its degree of dispersion. By way of example, it will be possible to improve the dispersion of the alumina source by a preliminary homogenization treatment. For homogenization, it is possible to use at least one of the homogenization treatments described in the following text.

The aqueous dispersions or suspensions of alumina that can be used are, in particular, the aqueous suspensions or dispersions of fine or ultra-fine boehmites that consist of particles that have dimensions in the colloidal range.

Fine or ultra-fine boehmites that are used according to this invention may have been obtained in particular according to French Patents FR-1 261 182 and FR-1 381 282 or European Patent Application EP 15 196.

It is also possible to use the aqueous suspensions or dispersions that are obtained from pseudo-boehmite, amorphous alumina gels, aluminum hydroxide gels or ultra-fine hydrargillite gels.

Aluminum monohydrate can be purchased from among a variety of commercial sources of alumina, such as, in particular, PURAL®, CATAPAL®, DISPERAL®, and DISPAL® that are marketed by the SASOL Company or else HIQ® that is marketed by ALCOA, or according to the methods that are known to one skilled in the art: it can be prepared by partial dehydration of aluminum trihydrate by conventional methods or it can be prepared by precipitation. When these alumina are presented in the form of a gel, they are peptized by water or an acidulated solution. In the precipitation, the acid source can be selected, for example, from among at least one of the following compounds: aluminum chloride, aluminum sulfate, or aluminum nitrate. The basic aluminum source can be selected from among the basic aluminum salts such as sodium aluminate and potassium aluminate.

As precipitating agents, sodium hydroxide, sodium carbonate, potash and ammonia can be used. The precipitating agents are selected such that the alumina source according to this invention and these agents are precipitated together.

According to the acidic or basic nature of the aluminum-based starting compound, the aluminum hydrate is precipitated with the help of a base or an acid that is selected, for example, from among hydrochloric acid, sulfuric acid, soda or a basic or acidic compound of the aluminum as cited above. The two reagents can be aluminum sulfate and soda aluminate. For an example of preparation of aluminum alpha-monohydrate that uses aluminum sulfate and soda aluminate, it is possible to refer in particular to U.S. Pat. No. 4,154,812.

In particular, pseudo-boehmite may have been prepared according to the process that is described in U.S. Pat. No. 3,630,670 by reaction of an alkaline aluminate solution with a mineral acid solution. The pseudo-boehmite may have been prepared in particular according to the process that is described in U.S. Pat. No. 3,630,670 by reaction of an alkaline aluminate solution with a solution of a mineral acid. It may also have been prepared as described in French Patent FR 1 357 830.

In particular, the amorphous alumina gels may have been prepared according to the processes that are described in the article "Alcoa Paper No. 19 (1972) pages 9 to 12" and in particular by reaction of acid aluminate or an aluminum salt or by hydrolysis of aluminum alcoholates or by hydrolysis of basic aluminum salts.

The aluminum hydroxide gels can be in particular those that have been prepared according to the processes that are described in U.S. Pat. Nos. 3,268,295 and 3,245,919.

In particular, the aluminum hydroxide gels may be those that are prepared according to the processes that are described in Patent WO 00/01617, by mixing an aluminum acid source and a base or an aluminum basic source and an acid so as to precipitate an alumina monohydrate, whereby the following stages are:

2. curing
3. filtration
4. washing, and
5. drying, processes characterized in that the mixing of stage one is carried out without retromixing.

The ultrafine hydrargillite may have been prepared in particular according to the process that is described in U.S. Pat. No. 1,371,808 by evolving toward a temperature encompassed between ambient temperature and 60° C. of alumina gels in cake form and containing 0.1 monovalent acid ions relative to the alumina, counted in $Al_2O_3$ molecules.

It is also possible to use ultra-pure aqueous suspensions or dispersions of boehmite or pseudo-boehmite that are prepared according to a process in which the reaction of an alkaline aluminate with the carbonic anhydride is carried out to form an amorphous aluminum hydroxycarbonate precipitate, the precipitate that is obtained by filtration is separated, and then the latter is washed (the process is described in particular in U.S. Pat. No. 3,268,295).

Then, a) in a first stage, the precipitate that is washed with amorphous aluminum hydroxycarbonate is mixed with an acid solution, a base or a salt or mixtures thereof, this mixing is carried out by pouring the solution over the hydroxycarbonate, whereby the pH of the thus constituted medium is less than 11, b) in a second stage, the thus constituted reaction medium is heated to a temperature of less than 90° C. for a period of at least 5 minutes, c) in a third stage, the medium that results from the second stage is heated to a temperature of between 90° C. and 250° C.

The boehmite and pseudo-boehmite dispersions or suspensions that are obtained according to this process exhibit an alkaline content of less than 0.005% that is expressed in the form of a ratio by weight of alkaline metal oxide/$Al_2O_3$.

When it is desired to produce very pure catalyst substrates, ultra-pure boehmite or pseudo-boehmite suspensions or dispersions are preferably used that have been obtained according to the process that was described above, or the aluminum hydroxide gels that were prepared starting from the hydrolysis of aluminum alcoholates according to a process of the type that is described in U.S. Pat. No. 2,892,858.

In summary, the production process that leads to such boehmite-type aluminum hydroxide gels obtained as a by-product in the production of alcohol by hydrolysis of an alcoholate or alkoxide of aluminum (Ziegler synthesis) is described. The Ziegler alcohol synthesis reactions are described in particular in U.S. Pat. No. 2,892,858. According to this process, first triethyl aluminum is prepared starting from aluminum, hydrogen and ethylene, whereby the reaction is carried out in two stages with partial recycling of triethyl aluminum.

Ethylene is added into the polymerization stage, and the product that is obtained is then oxidized into aluminum alcoholate, whereby the alcohols are obtained by hydrolysis.

The aluminum hydroxide gels can also be those that were prepared according to the processes described in U.S. Pat. Nos. 4,676,928-A and 6,030,599.

The hydrated alumina that is obtained as a by-product of the Ziegler reaction is described in particular in a report of the CONOCO Company dated Jan. 19, 1971.

The size of the alumina particles that constitute the alumina source can vary within wide limits. It is generally between 1 and 100 microns.

Methods

The substrate can be advantageously prepared by one of the methods described below.

By way of example, a method of preparation of a silica-alumina that is part of the invention consists in preparing, starting from a water-soluble alkaline silicate, an orthosilicic acid solution ($H_2SiO_4$, $H_2O$) that is decationized by ion exchange, then in simultaneously adding it to a cationic aluminum salt in solution, for example, nitrate, and to ammonia under controlled operating conditions; or else adding the orthosilicic acid solution to the cationic aluminum salt in solution and coprecipitating the solution that is obtained by ammonia under controlled operating conditions leading to a homogeneous product. This silica-alumina hydrogel is mixed with an aluminum hydrate powder or suspension. After filtering and washing, drying with shaping then calcination, preferably in air, in a rotary kiln, at a high temperature and for an adequate period to promote interactions between the alumina and the silica, generally at least two hours, a substrate that fulfills the characteristics of the invention is obtained.

Another method for preparation of silica-alumina according to the invention consists in precipitating the alumina hydrate as above, in filtering it and washing it, then in mixing it with aqueous orthosilicic acid so as to obtain a suspension, which is thoroughly homogenized by vigorous stirring and shearing. An Ultraturrax turbine or else a Staro turbine can be used, or else a colloidal mill, for example a Staro colloidal mill. The homogeneous suspension is then dried by spraying as above, then calcined between 500 and 1200° C. for at least three hours: a silica-alumina substrate that can be used in the process according to the invention is obtained.

Another method that is part of the invention consists in preparing as above a decationized solution of orthosilicic acid then in adding it simultaneously or consecutively to an alumina compound, for example an aluminum hydrate in powder or in acidulated suspension. To increase the diameter of the pores of the final silica-alumina substrate, at least one basic compound can optionally be added to the reaction medium. After intense homogenization of the suspension by stirring, optional adjustment by filtration of the content of dry material then optionally rehomogenization, the product is dried with simultaneous or consecutive shaping, then calcined as above.

Another method that is also part of the invention consists in preparing an aqueous alumina suspension or dispersion, for example an aluminum monohydrate, then in adding it simultaneously or consecutively to a silica compound, for example a sodium silicate. To increase the diameter of the pores of the final silica-alumina substrate, at least one basic compound can optionally be added to the reaction medium. The substrate is obtained by filtration and washing, optionally washing by an ammonia solution to extract the residual sodium by ion exchange, drying with simultaneous or consecutive shaping. After drying with shaping, then calcination as above, a substrate that fulfills the characteristics of the invention is obtained. The size of the alumina particles used is preferably between 1 and 100 microns to obtain good homogenization of the silica-alumina substrate according to the invention.

To increase the diameter of the mesopores of the silica-alumina substrate, it may be particularly advantageous, as U.S. Pat. No. 4,066,574 teaches us, to prepare an aqueous alumina suspension or dispersion, for example, an aluminum monohydrate, and then to neutralize it by a basic solution, for example ammonia, then to add it simultaneously or consecutively to a silica compound, for example a decationized orthosilicic acid solution. After an intensive homogenization of the suspension by intense stirring, optional adjustment by filtration of the dry material content then rehomogenization, the product is dried with simultaneous or consecutive shaping, then calcined as above. This method is also part of the methods that are used according to the invention.

In the disclosure of the above-mentioned methods, homogenization is used to describe putting back into solution a product that contains a solid fraction, for example a suspension, a powder, a filtered precipitate, then its dispersion under intense stirring. The homogenization of a dispersion is a process that is well known to one skilled in the art. Said homogenization can be carried out by any process that is known to one skilled in the art: by way of example, in a batch reactor, a continuous mixer, or a mixing machine. Such a mixing can be carried out in a piston flow reactor and in particular in a static reactor. The Lightnin reactors can be cited. An Ultraturrax® turbine or else a Staro® turbine can be used, or else a colloidal mill, for example a Staro colloidal mill. The commercial colloidal mills IKA® can also be used.

In all of the above-mentioned methods, it may optionally be desirable to add, during any arbitrary stage of the preparation, a minor proportion of at least one stabilizing element that is selected from the group that is formed by zirconia and titanium.

Shaping of Substrates and Catalysts

The substrate can be obtained by shaping the silica-alumina by any technique that is known to one skilled in the art. The shaping can be carried out, for example, by extrusion, by pelletizing, by the drop (oil-drop) coagulation method, by turntable granulation or by any other method that is well known to one skilled in the art.

The shaping can also be carried out in the presence of various components of the catalyst and extrusion of the mineral paste that is obtained, by pelletizing, shaping in the form of balls with a rotating groove or with a drum, drop coagulation, oil-drop, oil-up or any other known process for agglomeration of a powder that contains alumina and optionally other ingredients that are selected from among those that are mentioned above.

The catalysts that are used according to the invention have the shape of spheres or extrudates. It is advantageous, however, that the catalyst comes in the form of extrudates with a diameter between 0.5 and 5 mm and more particularly between 0.7 and 2.5 mm. The shapes are cylindrical (which may or may not be hollow), twisted cylindrical, multilobar (2, 3, 4 or 5 lobes, for example), and rings. The cylindrical shape is preferably used, but any other shape may be used.

Furthermore, these substrates that are used according to this invention may have been treated, as is well known to one skilled in the art, by additives to facilitate the shaping and/or to improve the final mechanical properties of the aluminosilicate substrates. By way of example of additives, it is possible to cite in particular cellulose, carboxymethyl cellulose, carboxyethyl cellulose, tall oil, xanthan gums, surfactants, flocculant agents such as polyacrylamides, carbon black, starches, stearic acid, polyacrylic alcohol, polyvinyl alcohol, biopolymers, glucose, polyethylene glycols, etc.

The adjustment of the porosity that is characteristic of the substrates of the invention is carried out partially during this shaping stage of the substrate particles.

The shaping can be carried out by using techniques for shaping catalysts, known to one skilled in the art, such as, for example: extrusion, sugar-coating, spray-drying or else pelletizing.

It is possible to add or to withdraw water to adjust the viscosity of the paste that is to be extruded. This stage can be carried out at any point of the mixing stage. In the case of aluminosilicate substrates, it may be advantageous to reduce the quantity of water of the paste so as to increase the mechanical power provided to the paste. This action is generally reflected by a reduction in the total volume for an optimal acid content.

To adjust the content of solid material of the paste that is to be extruded so as to make it extrudable, it is also possible to add a compound that is solid for the most part and preferably an oxide or a hydrate. A hydrate will preferably be used, and even more preferably, an aluminum hydrate will be used. The fire loss of this hydrate will be more than 15%.

The acid content added in the mixing before the shaping is less than 30%, preferably between 0.5 and 20% by weight of the anhydrous silica and alumina mass that is engaged in the synthesis.

The extrusion can be carried out by any conventional tool, available commercially. The paste that is obtained from mixing is extruded through a dye, for example with the help of a piston or a single- or double-extrusion screw. This extrusion stage can be carried out by any method that is known to one skilled in the art.

The substrate extrudates of the invention generally have a resistance to the crushing of at least 70 N/cm and preferably greater than or equal to 100 N/cm.

Calcination of the Substrate

Drying is carried out by any technique that is known to one skilled in the art.

To obtain the substrate of this invention, it is preferable to calcine preferably in the presence of molecular oxygen, for example by carrying out flushing with air, at a temperature that is less than or equal to 1100° C. At least one calcination can be carried out after any of the stages of the preparation. This treatment can be performed, for example, in a flow-through bed, in a swept bed or in static atmosphere. For example, the furnace that is used can be a rotary kiln or a vertical furnace with radial flow-through layers. The calcination conditions: temperature and duration depend mainly on the maximum temperature of use of the catalyst. The preferred conditions of calcination are between more than one hour at 200° C. to less than one hour at 1100° C. The calcination can be performed in the presence of water vapor. The final calcination can optionally be carried out in the presence of an acidic or basic vapor. For example, the calcination can be carried out under partial pressure of ammonia.

Post-Synthesis Treatments

Post-synthesis treatments can be carried out so as to improve the properties of the substrate, in particular its homogeneity as defined above.

According to a preferred embodiment, the post-synthesis treatment is a hydrothermal treatment. The hydrothermal treatment is carried out by any technique that is known to one skilled in the art. Hydrothermal treatment is defined as bringing into contact, in any stage of the production, the mixed substrate with water in vapor phase or in liquid phase. Hydrothermal treatment can be defined in particular as curing, steaming (vapor treatment), autoclaving, calcination in moist air, or rehydration. Without this reducing the scope of the invention, such a treatment has the effect of making the silica component mobile.

According to the invention, the curing can take place before or after the shaping.

According to a preferred method of the invention, the hydrothermal treatment is done by steaming (vapor treatment) in a furnace in the presence of water vapor. The temperature during the steaming (vapor treatment) can be between 600 and 1100° C. and preferably more than 700° C. during a period of time of between 30 minutes and 3 hours.

The water vapor content is more then 20 g of water per kg of dry air and preferably more than 40 g of water per kg of dry air and preferably more than 100 g of water per kg of dry air. Such a treatment can, if necessary, completely or partially replace the calcination treatment.

The substrate advantageously can be subjected to a hydrothermal treatment in a confined atmosphere. Hydrothermal treatment in a confined atmosphere is defined as a treatment by passing in an autoclave in the presence of water under a temperature that is higher than the ambient temperature.

During this hydrothermal treatment, it is possible to treat the shaped silica-alumina in different ways. Thus, it is possible to impregnate the silica-alumina with acid, prior to its passing in the autoclave, whereby autoclaving of the silica-alumina is done either in vapor phase or in liquid phase, whereby this vapor phase or liquid phase of the autoclave may or may not be acidic. This impregnation, prior to the autoclaving, may or may not be acidic. This impregnation, prior to the autoclaving, can be carried out in the dry state or by immersion of the silica-alumina in an acidic aqueous solution. Dry impregnation is defined as bringing into contact the alumina with a solution volume that is less than or equal to the total pore volume of the treated alumina. The impregnation is preferably carried out in the dry state.

The autoclave is preferably a rotary-basket autoclave such as the one that is defined in Patent Application EP-A-0 387 109.

The temperature during the autoclaving can be between 100 and 250° C. for a period of time of between 30 minutes and 3 hours.

Processes for Treatment of Hydrocarbon Feedstocks According to the Invention

In a general way, the catalysts according to the invention are used for the treatment of hydrocarbon fractions, generally in the presence of hydrogen, at a temperature of more than 200° C., under a pressure of more than 1 MPa, whereby the volumetric flow rate is encompassed between 0.1 and 20 $h^{-1}$, and the quantity of hydrogen that is introduced is such that the liter of hydrogen/liter of hydrocarbon volumetric ratio is encompassed between 80 and 5000 l/l.

The catalysts according to the invention are used advantageously for hydrocracking/hydroconverison of hydrocarbon fractions.

The catalysts according to the invention can also be used for the hydrotreatment of hydrocarbon feedstocks, alone or upstream from a hydrocracking/hydroconversion process on a hydrocracking catalyst with a zeolite or silica-alumina base, preferably comprising nickel and tungsten.

Sulfurization of the Catalysts

Prior to the injection of the feedstock, the catalysts that are used in the process according to this invention are preferably subjected in advance to a sulfurization treatment that makes it possible to transform, at least in part, the metal radicals into sulfide before their contact with the feedstock that is to be treated. This treatment of activation by sulfurization is well known to one skilled in the art and can be carried out by any method that is already described in the literature or in-situ, i.e., in the reactor, or ex-situ.

A standard sulfurization method that is well known to one skilled in the art consists in heating in the presence of hydrogen sulfide (pure or, for example, under a stream of a hydrogen/hydrogen sulfide mixture) at a temperature of between 150 and 800° C., preferably between 250 and 600° C., generally in a flow-through bed reaction zone.

Feedstocks

Very varied feedstocks can be treated by the processes according to the invention that are described above, and they generally contain at least 20% by volume and often at least 80% by volume of compounds that boil above 340° C.

The feedstock can be, for example, LCO (light cycle oil: light gas oils that are obtained from a catalytic cracking unit), atmospheric distillates, vacuum distillates, for example gas oils that are obtained from the direct distillation of crude or conversion units such as FCC, coker or visbreaking, as well as feedstocks that are obtained from units for extracting aromatic compounds from lubricating oil bases or obtained from solvent dewaxing of lubricating oil bases, or else distillates that are obtained from processes for desulfurization or hydroconverison in a fixed bed or in a boiling bed of RAT (atmospheric residues) and/or RSV (vacuum residues) and/or deasphalted oils, or else the feedstock can be a deasphalted oil, or else any mixture of the above-cited feedstocks. The list above is not limiting. The paraffins that are obtained from the Fischer-Tropsch process are excluded. In general, the feedstocks have a boiling point T5 of more than 340° C., and better yet of more than 370° C., i.e., 95% of the compounds that are present in the feedstock have a boiling point of more than 340° C., and better yet more than 370° C.

The nitrogen content of the treated feedstocks in the processes according to the invention is usually more than 500 ppm, preferably between 500 and 10,000 ppm by weight, more preferably between 700 and 4000 ppm by weight, and even more preferably between 1000 and 4000 ppm. The sulfur content of the treated feedstocks in the processes according to the invention is usually encompassed between 0.01 and 5% by weight, preferably between 0.2 and 4%, and even more preferably between 0.5 and 2%.

The feedstock can optionally contain metals. The cumulative content of nickel and vanadium of the treated feedstocks in the processes according to the invention is preferably less than 1 ppm by weight.

The content of asphaltenes is generally less than 3000 ppm, preferably less than 1000 ppm, even more preferably less than 200 ppm.

Guard Beds:

In the case where the feedstock contains resin- and/or asphaltene-type compounds, it is advantageous first to run the feedstock over a catalyst bed or adsorbent bed that is different from the hydrocracking or hydrotreatment catalyst.

The catalysts or guard beds that are used according to the invention have the shape of spheres or extrudates. It is advantageous, however, that the catalyst come in the form of extrudates with a diameter of between 0.5 and 5 mm and more particularly between 0.7 and 2.5 mm. The shapes are cylindrical (which may or may not be hollow), twisted cylindrical, or multilobar (2, 3, 4, or 5 lobes, for example), or rings. The cylindrical shape is preferably used, but any other shape may be used.

So as to remedy the presence of contaminants and/or poisons in the feedstock, the guard catalysts can, in another preferred embodiment, have more particular geometric shapes so as to increase their vacuum fraction. The vacuum fraction of these catalysts is encompassed between 0.2 and 0.75. Their outside diameter can vary between 1 and 35 mm. Among the particular shapes that are possible without this list being limiting: hollow cylinders, hollow rings, Raschig rings, notched hollow cylinders, indented hollow cylinders, pentaring cart wheels, multi-hole cylinders.

These catalysts may have been impregnated by a phase that may or may not be active. In a preferred manner, the catalysts are impregnated by a hydro-dehydrogenating phase. In a very preferred manner, the CoMo or NiMo phase is used.

These catalysts can exhibit macroporosity. The guard beds can be marketed by Norton-Saint-Gobain, for example the MacroTrap® guard beds. The guard beds can be marketed by Axens in the ACT family: ACT077, ACT935, ACT961 or HMC841, HMC845, HMC941 or HMC945.

It may be particularly advantageous to superpose these catalysts in at least two different beds of variable heights. The catalysts that have the highest void rate are preferably used in the first catalytic bed or beds at the inlet of the catalytic reactor. It may also be advantageous to use at least two different reactors for these catalysts.

The preferred guard beds according to the invention are the HMC and the ACT961.

Operating Conditions

The operating conditions such as temperature, pressure, hydrogen recycling rate, and hourly volumetric flow rate can be very variable based on the nature of the feedstock, the quality of the products desired and installations that the refiner uses. The hydrocracking/hydroconversion catalyst or the hydrotreatment catalyst is generally brought into contact, in the presence of hydrogen, with the feedstocks that are described above, at a temperature of more than 200° C., often between 250 and 480° C., advantageously between 320 and 450° C., preferably between 330 and 435° C., under a pressure of more than 1 MPa, often between 2 and 25 MPa, preferably between 3 and 20 MPa, whereby the volumetric flow rate is encompassed between 0.1 and 20 $h^{-1}$ and preferably 0.1-6 $h^{-1}$, preferably 0.2-3 $h^{-1}$, and the quantity of hydrogen that is introduced is such that the liter of hydrogen/liter of hydrocarbon volumetric ratio is encompassed between 80 and 5000 l/l and most often between 100 and 2000 l/l.

These operating conditions that are used in the processes according to the invention generally make it possible to achieve conversions per pass into products that have boiling points of less than 340° C. and, better, less than 370° C., more than 15% and even more preferably encompassed between 20 and 95%.

EMBODIMENTS

The hydrocracking/hydroconversion processes that use the catalysts according to the invention cover areas of pressure and conversion that range from mild hydrocracking to high-pressure hydrocracking. Mild hydrocracking is defined as a hydrocracking that leads to moderate conversions, generally less than 40%, and that operate at low pressure, generally between 2 MPa and 6 MPa.

The catalyst of this invention can be used by itself, in one or more catalytic beds, in a fixed bed, in one or more reactors, in a so-called single-stage hydrocracking arrangement, with or without liquid recycling of the unconverted fraction, optionally combined with a hydrorefining catalyst that is located upstream from the catalyst of this invention.

The catalyst of this invention can be used alone, in one or more boiling-bed reactors, in a so-called single-stage hydrocracking arrangement, with or without recycling liquid of the unconverted fraction, optionally combined with a hydrorefining catalyst that is located in a fixed-bed or boiling-bed reactor upstream from the catalyst of this invention.

The boiling bed operates by removing the spent catalyst and adding new catalyst every day in order to maintain stable catalyst activity.

In a so-called two-stage hydrocracking arrangement with intermediate separation between the two reaction zones, in a given stage, the catalyst of this invention can be used in one or in two reactors that may or may not be combined with a hydrorefining catalyst that is located upstream from the catalyst of this invention.

So-Called Single-Stage Process

The so-called single-stage hydrocracking primarily and generally comprises an intense hydrorefining whose purpose is to carry out intense hydrodenitrating and desulfurizing of the feedstock before the latter is sent to the hydrocracking catalyst itself, in particular in the case where the latter comprises a zeolite. This intense hydrorefining of the feedstock brings about only a limited conversion of the feedstock, into lighter fractions, which is inadequate and therefore should be completed on the more active hydrocracking catalyst. It should be noted, however, that no separation takes place between the two types of catalysts. The entire effluent at the reactor outlet is injected into the hydrocracking catalyst itself, and it is only then that a separation of the products that are formed is carried out. This version of hydrocracking, also called "Once Through," has a variant that exhibits a recycling of the unconverted fraction toward the reactor for the purpose of a more intense conversion of the feedstock.

So-Called Single-Stage Fixed-Bed Process

In the case where the catalyst according to this invention is used upstream from a zeolitic hydrocracking catalyst, for example with a Y zeolite base, a catalyst that has a high content by weight of silica, i.e., with contents by weight of silica of the substrate that is part of the composition of the catalyst encompassed between 20 and 80%, and preferably between 30 and 60%, will advantageously be used. It can also advantageously be used in combination with a hydrorefining catalyst, whereby the latter is located upstream from the catalyst of this invention.

When the catalyst according to this invention is used upstream from a hydrocracking catalyst with an alumina-silica base or a zeolite base, in the same reactor in separate catalytic beds or in separate reactors, the conversion is generally (or preferably) less than 50% by weight and preferably less than 40%.

The catalyst according to the invention can be used upstream or downstream from the zeolitic catalyst. Downstream from the zeolitic catalyst, it allows the HPA to be cracked. HPA is defined as the polyaromatic hydrocarbons as described in particular in the work "Hydrocracking, Science and Technology," of J. Scherzer, Editions of M. Dekker, Incorporated, 1996.

So-Called Single-Stage Boiling Bed Process

The catalyst according to the invention can be used alone in one or more reactors.

Within the framework of such a process, it advantageously may be possible to use several reactors that are arranged in series, the boiling-bed reactor or reactors that contain the catalyst according to the invention being preceded by one or more reactors that contain at least one fixed-bed or boiling-bed hydrorefining catalyst.

When the catalyst according to this invention is used downstream from a hydrorefining catalyst, the conversion of the fraction of the feedstock that is caused by this hydrorefining catalyst is generally (or preferably) less than 30% by weight and preferably less than 25%.

So-Called Single-Stage Fixed-Bed Process with Intermediate Separation

The catalyst according to this invention can also be used in a so-called single-stage hydrocracking process that comprises a hydrorefining zone, a zone that allows the partial elimination of ammonia, for example by a hot flash, and a zone that comprises a hydrocracking catalyst. This process of hydrocracking hydrocarbon feedstocks in a single stage for the production of middle distillates and optionally oil bases comprises at least a first reaction zone that includes hydrorefining and at least a second reaction zone, in which the hydrocracking of at least a portion of the effluent of the first reaction zone is carried out. This process also comprises an incomplete separation of the ammonia of the effluent that exits from the first zone. This separation is advantageously carried out by means of an intermediate hot flash. The hydrocracking that is carried out in the second reaction zone is carried out in the presence of ammonia in a quantity that is less than the quantity that is present in the feedstock, preferably less than 1500 ppm by weight, more preferably less than 1000 ppm by weight, and even more preferably less than 800 ppm by weight of nitrogen. The catalyst of this invention is preferably used in the hydrocracking reaction zone that may or may not be combined with a hydrorefining catalyst that is located upstream from the catalyst of this invention. The catalyst according to the invention can be used upstream or downstream from the zeolitic catalyst. Downstream from the zeolitic catalyst, it makes it possible in particular to convert the HPA or the HPA precursors.

The catalyst according to the invention can be used either in the first conversion pretreatment reaction zone, alone or in combination with a standard hydrorefining catalyst, located upstream from the catalyst according to the invention, in one or more catalytic beds, in one or more reactors.

So-Called Single-Stage Hydrocracking Process with Preliminary Hydrorefining on a Low-Acidity Catalyst.

The catalyst according to the invention can be used in a hydrocracking process that comprises:

A first hydrorefining reaction zone in which the feedstock is brought into contact with at least one hydrorefining catalyst that exhibits a cyclohexane conversion level that is less than 10% by mass in the standard activity test.

A second hydrocracking reaction zone in which at least a portion of the effluent that is obtained from the hydrorefining stage is brought into contact with at least one zeolitic hydrocracking catalyst that exhibits a cyclohexane conversion level that is higher than 10% by mass in the standard activity test, whereby the catalyst according to the invention is present in at least one of the two reaction zones.

The proportion of the catalytic volume of the hydrorefining catalyst generally represents 20 to 45% of the total catalytic volume.

The effluent that is obtained from the first reaction zone is at least partly, preferably completely, introduced into the second reaction zone of said process. An intermediate separation of the gases can be carried out as described above.

The effluent at the outlet of the second reaction zone is subjected to a so-called final separation (for example by atmospheric distillation optionally followed by a vacuum distillation) so as to separate the gases. At least one residual liquid fraction that essentially contains products whose boiling point is generally more than 340° C. and that can be at least partly recycled upstream from the second reaction zone of the process according to the invention and preferably upstream from the hydrocracking catalyst with a silica-alumina base is obtained in a middle distillate production objective.

The conversion into products that have boiling points of less than 340° C., or else less than 370° C., is at least 50% by weight.

So-Called Two-Stage Process

The two-stage hydrocracking comprises a first stage whose objective is, as in the "single-stage" process, to carry out the hydrorefining of the feedstock, but also to attain a conversion of the latter on the order in general of 40 to 60%. The effluent that is obtained from the first stage then undergoes a separation (distillation) that is most often called an intermediate separation, which has the objective of separating the conversion products of the unconverted fraction. In the second stage of a two-stage hydrocracking process, only the fraction of the feedstock that is unconverted during the first stage is treated. This separation makes it possible for a two-stage hydrocracking process to be more selective in middle distillates (kerosene+diesel) than a single-stage process. Actually, the intermediate separation of the conversion products prevents their "over-cracking" into naphtha and gas in the second stage on the hydrocracking catalyst. Furthermore, it should be noted that the unconverted fraction of the feedstock that is treated in the second stage generally contains very low contents of $NH_3$ as well as organic nitrogen-containing compounds, in general less than 20 ppm by weight, and even less than 10 ppm by weight.

The same configuration of catalytic beds in fixed beds or in boiling beds can be used in the first stage of a so-called two-stage arrangement, whether the catalyst be used alone or in combination with a standard hydrorefining catalyst. The catalyst according to the invention can be used upstream or downstream from the zeolitic catalyst. Downstream from the zeolitic catalyst, it makes it possible in particular to convert the HPA or the HPA precursors.

For the so-called single-stage processes and for the first stage of the two-stage hydrocracking processes, the preferred catalysts according to the invention are the doped catalysts with a base of non-noble elements of group VIII, even more preferably the catalysts with a nickel and tungsten base, whereby the preferred dopant is phosphorus.

The catalysts that are used in the second stage of the two-stage hydrocracking processes are preferably doped catalysts with a base of noble elements of group VIII, even more preferably the catalysts with a platinum and/or palladium base, whereby the preferred dopant is phosphorus.

The following examples illustrate this invention without, however, limiting its scope.

EXAMPLE 1

Preparation and Shaping of a Standard Silica-Alumina (SA2)

An alumina hydrate is prepared according to the teachings of U.S. Pat. No. 3,124,418. After filtration, the freshly prepared precipitate is mixed with a silicic acid solution that is prepared by decationizing resin exchange. The proportions of the two solutions are adjusted so as to attain a composition of 70% $Al_2O_3$-30% $SiO_2$ on the final substrate. This mixture is quickly homogenized in a commercial colloidal mill in the presence of nitric acid such that the nitric acid content of the suspension at the outlet of the mill is 8% relative to the silica-alumina mixed solid. Then, the suspension is dried in a standard way in a sprayer in a conventional manner at 300° C. to 60° C. The thus prepared powder is shaped in a Z arm in the presence of 3% nitric acid relative to the anhydrous product. The extrusion is carried out by running the paste through a die that is equipped with orifices with a 1.4 mm diameter. The thus obtained extrudates are dried at 150° C., then calcined at 550° C., then calcined at 750° C. in the presence of water vapor.

The characteristics of the SA2 substrate are as follows:

The composition of the silica-alumina substrate is 71% $Al_2O_3$ and 29% $SiO_2$.

The BET surface area is 264 m²/g.

The total pore volume, measured by nitrogen adsorption, is 0.39 ml/g.

The total pore volume, measured by mercury porosimetry, is 0.35 ml/g.

The mean pore diameter, measured by mercury porosimetry, is 59 Å.

The ratio between volume V2, measured by mercury porosimetry, encompassed between $D_{mean}-30$ Å and $D_{mean}+30$ Å to the total pore volume that is measured by mercury porosimetry is 0.87.

Volume V3, measured by mercury porosimetry, encompassed in the pores with diameters of more than $D_{mean}+30$ Å is 0.045 ml/g.

Volume V6, measured by mercury porosimetry, encompassed in the pores with diameters of more than $D_{mean}+15$ Å is 0.05 ml/g.

The ratio between the adsorption surface area and the BET surface area is 0.90.

The pore volume, measured by mercury porosimetry, encompassed in the pores with a diameter of more than 140 Å is 0.040 ml/g.

The pore volume, measured by mercury porosimetry, encompassed in the pores with a diameter of more than 160 Å is 0.0385 ml/g.

The pore volume, measured by mercury porosimetry, encompassed in the pores with a diameter of more than 200 Å is 0.038 ml/g.

The pore volume, measured by mercury porosimetry, encompassed in the pores with a diameter of more than 500 Å is 0.032 ml/g.

The X diffraction diagram contains the primary lines that are characteristic of the gamma-alumina and in particular it contains the peaks at one d encompassed between 1.39 to 1.40 Å and at one d encompassed between 1.97 Å to 2.00 Å.

The B/L ratio of the substrate is 0.11.

The atomic sodium content is 250+/−20 ppm. The atomic sulfur content is 2000 ppm.

The NMR MAS spectra of the solid of $^{27}Al$ of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be broken down into at least two radicals. The predominant radical of this cluster would correspond to $Al_{IV}$ atoms (tetrahedral). The proportion of octahedral $Al_{VI}$ is 69%.

The substrate contains two aluminosilicate zones, whereby said zones have Si/Al ratios that are less than or greater than the overall Si/Al ratio that is determined by X fluorescence. One of the zones has a TEM-determined Si/Al ratio of 0.35.

EXAMPLE 2

Preparation and Shaping of a Silica-Alumina According to the Invention (SA3)

The aluminum hydroxide powder was prepared according to the process that is described in Patent WO 00/01617. The size of the mean particles of the aluminum hydroxide particles that is measured by laser granulometry is 40 microns.

This powder is mixed with a silica sol that is prepared by decationizing resin exchange, then filtered on a resin with a pore size of 2. The concentrations of silica sol and aluminum hydroxide powder are adjusted so as to obtain a final composition of 60% $Al_2O_3$ and 40% $SiO_2$. The shaping is carried out in the presence of 8% nitric acid relative to the anhydrous product. The mixing is done in a Z-arm mixing machine. The extrusion is carried out by running the paste through a die that is equipped with orifices with a diameter of 1.4 mm. The extrudates that are thus obtained are dried at 150° C., then calcined at 550° C., then calcined at 700° C. in the presence of water vapor.

The characteristics of the substrate are as follows:

The composition of the silica-alumina substrate is 59.7% $Al_2O_3$ and 40.3% $SiO_2$.

The BET surface area is 253 $m^2/g$.

The total pore volume, measured by nitrogen adsorption, is 0.4 ml/g.

The total pore volume, measured by mercury porosimetry, is 0.4 ml/g.

The mean pore diameter, measured by mercury porosimetry, is 51 Å.

The ratio between volume V2, measured by mercury porosimetry, encompassed between $D_{mean}$−30 Å and $D_{mean}$+30 Å, to the total pore volume, measured by mercury porosimetry, is 0.9.

Volume V3, measured by mercury porosimetry, encompassed in the pores with a diameter of more than $D_{mean}$+30 Å, is 0.072 ml/g.

Volume V6, measured by mercury porosimetry, encompassed in the pores with a diameter of more than $D_{mean}$+15 Å is 0.087 ml/g.

The ratio between the adsorption surface area and the BET surface area is 0.83.

The pore volume, measured by mercury porosimetry, encompassed in the pores with a diameter of more than 140 Å, is 0.055 ml/g.

The pore volume, measured by mercury porosimetry, encompassed in the pores with a diameter of more than 160 Å, is 0.053 ml/g.

The pore volume, measured by mercury porosimetry, encompassed in the pores with a diameter of more than 200 Å, is 0.051 ml/g.

The pore volume, measured by mercury porosimetry, encompassed in the pores with a diameter of more than 500 Å, is 0.045 ml/g.

The B/L ratio of the substrate is 0.12.

The X diffraction diagram contains the primary lines that are characteristic of the gamma-alumina, and in particular it contains the peaks at one d encompassed between 1.39 and 1.40 Å and at one d encompassed between 1.97 Å to 2.00 Å.

The atomic sodium content is 200+/−20 ppm. The atomic sulfur content is 800 ppm.

The NMR MAS spectra of the solid of $^{27}Al$ of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be broken down into at least two radicals. The predominant radical of this cluster would correspond to $Al_{IV}$ atoms (tetrahedral). The proportion of octahedral $Al_{VI}$ is 70%.

The substrate contains two aluminosilicate zones, whereby said zones have Si/Al ratios that are less than or greater than the overall Si/Al ratio that is determined by X fluorescence. One of the zones has a TEM-determined Si/Al ratio of 0.4.

EXAMPLE 3

Preparation of Non-Standard Hydrocracking Catalysts C1 and C6

Catalysts C1 and C6 are obtained by dry impregnation respectively of substrates SA2 and SA3 in the form of extrudates whose preparation was described in Examples 1 and 2 by an aqueous solution that contains tungsten and nickel salts. The tungsten salt is ammonium metatungstate $(NH_4)_6H_2W_{12}O_{40}*4H_2O$ and that of nickel is nickel nitrate $Ni(NO_3)_2*6H_2O$. After maturation at ambient temperature in a water-saturated atmosphere, the impregnated extrudates are dried at 120° C. for one night then calcined at 500° C. in dry air.

EXAMPLE 4

Preparation of Standard Hydrocracking Catalysts C2, C3, C4 and Non-Standard Hydrocracking Catalyst C5

Catalysts C2, C3, C4 and C5 are obtained by dry impregnation of substrate SA2 in the form of extrudates, whose preparation was described in Example 1, by an aqueous solution that contains salts of tungsten and nickel and phosphoric acid $H_3PO_4$. The tungsten salt is ammonium metatungstate $(NH_4)_6H_2W_{12}O_{40}*4H_2O$ and that of nickel is nickel nitrate $Ni(NO_3)_2*6H_2O$. After maturation at ambient temperature in a water-saturated atmosphere, the impregnated extrudates are dried at 120° C. for one night then calcined at 500° C. in dry air.

EXAMPLE 5

Preparation of Non-Standard Hydrocracking Catalyst C10 and Standard Hydrocracking Catalysts C7, C8 and C9

Catalysts C7, C8, C9 and C10 are obtained by dry impregnation of substrate SA3 in the form of extrudates, whose preparation was described in Example 2, by an aqueous solution that contains salts of tungsten and nickel and phosphoric acid $H_3PO_4$. The tungsten salt is ammonium metatungstate $(NH4)_6H_2W_{12}O_{40}*4H_2O$ and that of nickel is nickel nitrate $Ni(NO_3)_2*6H_2O$. After maturation at ambient temperature in a water-saturated atmosphere, the impregnated extrudates are dried at 120° C. for one night then calcined at 500° C. in dry air.

EXAMPLE 6

Preparation of Standard Hydrocracking Catalysts C11 and C12

Substrates SA5 and SA4 are prepared respectively from substrates SA2 and SA3 in the form of dried and calcined extrudates. After cooling, sample SA2, or SA3, is brought into contact with an ethanolic solution of tetraethyl orthosilicate $Si(OC_2H_5)_4$. This contact is carried out at ambient temperature for 2 hours while being stirred. The solvent is then evaporated under reduced pressure. Then, the impregnated extrudates are dried at 120° C. for 15 hours and calcined at 530° C. under a stream of dry air for 2 hours. The sample that is thus obtained is named SA4, or SA5. The catalysts C11 and C12 are obtained by dry impregnation of substrates SA4 and SA5 in the form of extrudates via an aqueous solution that contains salts of tungsten and nickel and phosphoric acid $H_3PO_4$. The tungsten salt is ammonium metatungstate $(NH_4)_6 H_2W_{12}O_{40}*4H_2O$ and that of nickel is nickel nitrate $Ni(NO_3)_2*6H_2O$. After maturation at ambient temperature in a water-saturated atmosphere, the impregnated extrudates are dried at 120° C. for one night then calcined at 500° C. in dry air.

EXAMPLE 7

Preparation of Standard Hydrocracking Catalysts C13 and C14

We impregnated the sample of catalysts C3 and C8 by an aqueous solution that contains ammonium biborate. After maturation at ambient temperature in a water-saturated atmosphere, the impregnated extrudates are dried for one night at 120° C., then calcined at 550° C. for 2 hours in dry air. A catalyst that is named C13, or C14, is obtained.

EXAMPLE 8

Preparation of Non-Standard Hydrocracking Catalysts C15, C17 and Standard Hydrocracking Catalysts C16, C18

The catalysts named C15, C16, C17, and C18 are prepared in the following way. During the preparation of substrates SA2 and SA3, we introduced titanium oxide of the Degussa P25 brand during the shaping of the substrate of the powder. The extrudates undergo the same calcination treatment as the initial substrates. Then, the impregnation of the active phase was conducted according to the procedure described in Example 3 (C15, C17), Example 4 (C16), and Example 5 (C18).

The final contents by weight of $WO_3$, $NiO$, $P_2O_5$, $SiO_2$, $B_2O_3$ and $TiO_2$ of the catalysts are presented in Table 1 below.

TABLE 1

Contents by Weight of $WO_3$, NiO and $P_2O_5$ SBET, VHg and DRT of Catalysts C1 to C18

|  | C1 | C2 | C3 | C4 | C5 | C6 | C7 |
|---|---|---|---|---|---|---|---|
| NiO (% by Weight) | 3.5 | 3.4 | 3.2 | 3.6 | 3.3 | 3.6 | 3.4 |
| $WO_3$ (% by Weight) | 24.9 | 24.3 | 24.4 | 24.7 | 24.8 | 24.5 | 24.6 |
| $P_2O_5$ (% by Weight) | 0 | 2.9 | 1.51 | 0.5 | 6.6 | 0 | 3.1 |
| SBET (m²/g) | 182 | 160 | 168 | 180 | 141 | 210 | 199 |
| VHg (cm³/g) | 0.32 | 0.32 | 0.32 | 0.32 | 0.31 | 0.35 | 0.35 |
| DRT (g/cm³) | 0.98 | 0.99 | 0.98 | 0.98 | 1 | 0.95 | 0.96 |
| Substrate | SA2 | SA2 | SA2 | SA2 | SA2 | SA3 | SA3 |

|  | C8 | C9 | C10 |
|---|---|---|---|
| NiO (% by Weight) | 3.5 | 3.5 | 3.6 |
| $WO_3$ (% by Weight) | 24.5 | 24.8 | 24.3 |
| $P_2O_5$ (% by Weight) | 1.5 | 0.5 | 6.6 |
| SBET (m²/g) | 205 | 207 | 176 |
| VHg (cm³/g) | 0.35 | 0.35 | 0.34 |
| DRT (g/cm³) | 0.96 | 0.95 | 0.97 |
| Substrate | SA3 | SA3 | SA3 |

|  | C11 | C12 | C13 | C14 | C15 | C16 | C17 | C18 |
|---|---|---|---|---|---|---|---|---|
| NiO (% by Weight) | 3.5 | 3.5 | 3.1 | 3.4 | 3.4 | 3.5 | 3.5 | 3.5 |
| $WO_3$ (% by Weight) | 24.9 | 24.5 | 23.9 | 24.1 | 24.45 | 24.3 | 24.5 | 25 |
| $P_2O_5$ (% by Weight) | 1.5 | 1.5 | 1.5 | 1.5 | 0 | 2.9 | 0 | 3.1 |
| $SiO_2$ (% by Weight) Deposited on the Substrate | 2 | 2 | 0 | 0 | 0 | 0 | 0 | 0 |
| $B_2O_3$ (% by Weight) | 0 | 0 | 2 | 2 | 0 | 0 | 0 | 0 |
| TiO2 | 0 | 0 | 0 | 0 | 10 | 10 | 10 | 10 |
| SBET (m²/g) | 160 | 210 | 155 | 201 | 168 | 155 | 193 | 188 |

TABLE 1-continued

Contents by Weight of WO$_3$, NiO and P$_2$O$_5$ SBET, VHg and DRT of Catalysts C1 to C18

| VHg (cm$^3$/g) | 0.32 | 0.35 | 0.32 | 0.35 | 0.31 | 0.31 | 0.32 | 0.32 |
|---|---|---|---|---|---|---|---|---|
| DRT (g/cm$^3$) | 0.98 | 0.95 | 0.98 | 0.95 | 1.01 | 1.01 | 0.99 | 0.99 |
| Substrate | SA4 | SA5 | SA2 | SA3 | SA2 + Ti | SA2 + Ti | SA3 + Ti | SA3 + Ti |

Catalysts C2, C3, C4, C7, C8, C9, C11, C12, C13, C14, C16, and C18 are in accordance with the invention. Catalysts C1, C5, C6, C10, C15 and C17 are not in accordance with the invention.

EXAMPLE 9

Preparation of Hydrocracking Catalysts C19, C20 and C21

Substrate SA2 (in extrudate form), prepared in Example 1, is impregnated in the dry state by a hexachloroplatinic acid solution H$_2$PtCl$_6$. The impregnated extrudates are then calcined at 550° C. in dry air. Catalyst C19 is obtained with a platinum content of 0.48% by weight.

To obtain catalysts C20 and C21, the extrudates are then impregnated by an aqueous solution of phosphoric acid H$_3$PO$_4$ with two different contents. After maturation at ambient temperature in a water-saturated atmosphere, the impregnated extrudates are dried at 120° C. for one night, then calcined at 500° C. in dry air. The P$_2$O$_5$ content is 0.5% (C20) and 6% (C21).

EXAMPLE 10

Evaluation of Catalysts C1 to C18 by Hydrocracking a Vacuum Distillate in a High-Pressure Stage Catalysts C1 to C18, whose preparation is described in Examples 3 to 5, are used for carrying out hydrocracking of a vacuum distillate whose primary characteristics are given below:

| Type of Feedstock | Vacuum Distillate |
|---|---|
| Density at 15° C. | 0.9219 |
| Sulfur, % by Weight | 2.52 |
| Nitrogen, ppm by weight | 880 |
| Simulated Distillation | |
| SD: 05% p° C. | 367 |
| SD: 10% p° C. | 380 |
| SD: 50% p° C. | 443 |
| SD: 90% p° C. | 520 |
| SD: End Point ° C. | 690 |

Catalysts C1 to C18 were used according to the process of the invention by using a pilot unit that comprises 1 flow-through fixed-bed reactor, and the fluids circulate from bottom to top (up-flow).

Prior to the hydrocracking test, the catalysts are sulfurized at 120 bar, at 350° C. by means of a direct distillation gas oil that is supplemented with 2% by weight of DMDS.

After sulfurization, the catalytic tests were carried out under the following situations:

| Total Pressure | 14 MPa | T = 400° C. |
|---|---|---|

The volumetric flow rate (VVH) is equal to 0.7 h−1.

The catalytic performance levels are expressed by the net conversion into products that have a boiling point of less than 370° C., by the net selectivity of the middle distillate fraction of 150-370° C., and the ratio of gas oil yield/kerosene yield in the middle distillate fraction. They are expressed from simulated distillation results.

The net conversion NC is assumed to be equal to:

NC 370° C.=[(% of 370° C.$^-_{effluents}$)−(% of 370° C.$^-_{feedstock}$)]/[100−(% of 370° C.$^-_{feedstock}$)]

with

% of 370° C.$^-_{effluents}$=content by mass of compounds that have boiling points of less than 370° C. in the effluents, and % of 370° C.$^-_{feedstock}$=content by mass of compounds that have boiling points of less than 370° C. in the feedstock.

The coarse selectivity of middle distillate CS is assumed to be equal to:

CS definition=[(fraction of 150-370$_{effluents}$)]/[(% of 370° C.$^-_{effluents}$)]

The catalytic performance levels that are obtained are provided in Table 2 below.

TABLE 2

Catalytic Results of Single-Stage and High-Pressure Hydrocracking:

| Catalyst | VVh (h$^{-1}$) | CN 370° C.$^-$ % by Weight | CS % by Weight Middle Distillate (MD) |
|---|---|---|---|
| C1 | 0.7 | 71.7 | 73.2 |
| C2 | 0.7 | 73.7 | 73.4 |
| C3 | 0.7 | 74.0 | 73.5 |
| C4 | 0.7 | 73.9 | 73.5 |
| C5 | 0.7 | 70.5 | 73.2 |
| C6 | 0.7 | 71.5 | 73.2 |
| C7 | 0.7 | 73.1 | 73.4 |
| C8 | 0.7 | 73.9 | 73.5 |
| C9 | 0.7 | 73.8 | 73.5 |
| C10 | 0.7 | 70.4 | 73.2 |
| C11 | 0.7 | 74.1 | 73.5 |
| C12 | 0.7 | 74.0 | 73.5 |
| C13 | 0.7 | 74.1 | 73.5 |
| C14 | 0.7 | 74.0 | 73.5 |
| C15 | 0.7 | 71.9 | 73.2 |
| C16 | 0.7 | 73.4 | 73.4 |
| C17 | 0.7 | 71.8 | 73.2 |
| C18 | 0.7 | 73.3 | 73.4 |

EXAMPLE 11

Evaluation of Catalysts C19, C20, C21 Under Conditions that Simulate the Operation of the Second Reactor of a So-Called Two-Stage Hydrocracking Process The feedstock of the second stage is produced by hydrotreatment of a vacuum distillate on a hydrorefining catalyst that is marketed by Axens in the presence of hydrogen at a temperature of 395° C. and at the hourly volumetric flow rate of 0.55 h−1. The conversion of products at 380° C. is about 50% by weight. After one separation stage, the 380° C.+ fraction is collected and will be used as feedstock for the second stage. The physico-chemical characteristics of this feedstock are provided in Table 3:

TABLE 3

Characteristics of the Second-Stage Feedstock

| | |
|---|---|
| Density (20/4) | 0.853 |
| Sulfur (ppm by Weight) | 2.5 |
| Nitrogen (ppm by Weight) | 1.4 |
| Simulated Distillation | |
| Starting Point | 322°C. |
| 5% Point | 364°C. |
| 10% Point | 383°C. |
| 50% Point | 448°C. |
| 90% Point | 525°C. |
| End Point | 589°C. |

This feedstock is injected into the $2^{nd}$-stage hydrocracking test unit that comprises a fixed-bed reactor with upward circulation of the feedstock ("upflow"), into which is introduced catalyst C4 that is prepared Example 4. Before injecting the feedstock, the catalyst is reduced under pure hydrogen at 450° C. for 2 hours.

The operating conditions of the test unit are as follows:

| | |
|---|---|
| Total Pressure | 14 MPa |
| Catalyst | 50 ml |
| Temperature | 370° C. |
| Volumetric Flow Rate (vvh) $h^{-1}$ | 1.1 |

The catalytic performance levels that are obtained under these conditions are described in Table 4 of this example.

TABLE 4

Catalytic Results

| Catalyst | VVh ($h^{-1}$) | CN 370° C.− % by Weight | CS % by Weight Middle Distillate (MD) | Gas Oil/Kerosene Ratio % by Weight/% by Weight |
|---|---|---|---|---|
| C19 | 1.1 | 76.5 | 72.0 | 1.1 |
| C20 | 1.1 | 77.5 | 72.0 | 1.1 |
| C21 | 1.1 | 74.5 | 72.0 | 1.1 |

The preceding Examples 9 and 11 therefore show every advantage to using a catalyst according to the invention to carry out the hydrocracking of hydrocarbon feedstock. Actually, they make it possible to obtain elevated conversions of the feedstock and advantageous middle distillate selectivities.

EXAMPLE 12

Preparation of Catalysts C22 (Non-Standard) and C23 (Standard)

Catalyst C22 is obtained by dry impregnation from substrate SA2 in the form of extrudates, whose preparation was described in Example 1, by an aqueous solution that contains molybdenum and nickel salts. The molybdenum salt is ammonium heptamolybdate and that of nickel is nickel nitrate $Ni(NO_3)_2 \cdot 6H_2O$. After maturation at ambient temperature in a water-saturated atmosphere, the impregnated extrudates are dried at 120° C. for one night, then calcined at 500° C. in dry air.

Catalyst C23 is obtained by dry impregnation of substrate SA2 in the form of extrudates, whose preparation was described in Example 1, by an aqueous solution that contains salts of molybdenum and tungsten and nickel and phosphoric acid $H_3PO_4$. The tungsten salt is ammonium metatungstate. The molybdenum salt is ammonium heptamolybdate, and that of nickel is nickel nitrate $Ni(NO_3)_2 \cdot 6H_2O$. After maturation at ambient temperature in a water-saturated atmosphere, the impregnated extrudates are dried at 120° C. for one night then calcined at 500° C. in dry air. The characteristics of the catalysts are provided in the table below.

TABLE 5

Contents by Weight of NiO, $MoO_3$, $WO_3$, and $P_2O_5$, $S_{BET}$, $V_{Hg}$ and DRT of Catalysts C22 and C23

| | C22 | C23 |
|---|---|---|
| NiO (% by Weight) | 3 | 4.3 |
| $WO_3$ (% by Weight) | 13 | 24.8 |
| $MO_3$ (% by Weight) | 5 | 5.1 |
| $P_2O_5$ (% by Weight) | 0 | 2 |
| $S_{BET}$ ($m^2/g$) | 161 | 145 |
| $V_{Hg}$ ($cm^3/g$) | 0.3 | 0.3 |
| DRT ($g/cm^3$) | 0.97 | 1 |
| Substrate | SA2 | SA2 |

EXAMPLE 13

Evaluation of Catalysts C1 (Non-Standard), C4 (Standard), C5 (Non-Standard), C22 (Non-Standard) and C23 (Standard) in Hydrocracking of a Vacuum Distillate in a Single Stage at Moderate Pressure (Soft Hydrocracking)

Catalysts C1, C4 and C5, whose preparation is described in Example 5 and in Example 4, and C22 and C23, whose preparation is described in Example 12, are used to carry out the hydrocracking of the vacuum distillate, described in Example 10.

Catalysts C1, C4, C5, C22 and C23 were implemented according to the process of invention by using a pilot unit that comprises a flow-through fixed-bed reactor; the fluids circulate from bottom to top (up-flow).

Prior to the hydrocracking test, the catalysts are sulfurized at 120 bar, at 350° C. by means of a direct distillation gas oil that is supplemented with 2% by weight of DMDS.

After sulfurization, the catalytic tests were carried out under the following conditions:

| Total pressure | 5.5 MPa | T = 405° C. |
|---|---|---|
| Overall VVH | 0.8 h$^{-1}$ | |

The volumetric flow rate (VVH) is equal to 0.8 h−1.

The catalytic performance levels are expressed by the net conversion into products that have a boiling point of less than 370° C., by the net selectivity of middle distillate fraction of 150-370° C. and the ratio of gas oil yield/kerosene yield in the middle distillate fraction. They are expressed from simulated distillation results, and the definitions are identical to those given in Example 9.

The catalytic performance levels that are obtained are provided in Table 6 below.

TABLE 6

Catalytic Results of Soft Hydrocracking at Moderate Pressure:

| Catalyst | VVh (h$^{-1}$) | CN 370° C.<br>% by Weight | CS % by Weight<br>Middle Distillate<br>(MD) |
|---|---|---|---|
| C1 | 0.8 | 48.2 | 81.2 |
| C4 | 0.8 | 49.5 | 81.5 |
| C5 | 0.8 | 47.5 | 80.9 |
| C22 | 0.8 | 48.8 | 81.3 |
| C23 | 0.8 | 49.3 | 81.4 |

EXAMPLE 14

Preparation of Non-Standard Catalyst C24

The SA6 substrate was prepared according to a conventional procedure of alumina-silica in a 2-liter reactor from sodium metasilicate and a ratio of Na$_2$O/SiO$_2$=1. The targeted content is 75% silica (by weight) and 25% alumina. The synthesis consisted in introducing, within 3 minutes, 700 ml of a sodium metasilicate solution at 5 g/l in SiO2 into 700 ml, already placed in the reactor, of aluminum sulfate that titrates at 1.64 g/l of alumina that is supplemented with sulfuric acid at 30% by weight. A curing period of 30 minutes was carried out. The precipitate that was obtained was filtered on a fabric frame, then washed with water, exchanged with ammonium nitrate then rewashed with water. The cake that is obtained is shaped after its fire loss is adjusted. The extrusion was conducted on a piston equipped with a 1.6 mm die. The extrudates are placed in a ventilated oven at 120° C., then calcined in a furnace with a bed that is flushed by dry air at 550° C. for 4 hours. The surface area of the substrate is 240 m$^2$/g. This substrate is quite comparable to commercial silica-aluminas of 75-25 composition.

Catalyst C24 is obtained by dry impregnation of the SA6 substrate in the form of extrudates, by an aqueous solution that contains tungsten salts and nickel salts. The tungsten salt is ammonium metatungstate (NH$_4$)$_6$H$_2$W$_{12}$O$_{40}$*4H$_2$O and that of nickel is nickel nitrate Ni(NO$_3$)$_2$*6H$_2$O. After maturation at ambient temperature in a water-saturated atmosphere, the impregnated extrudates are dried at 120° C. for one night then calcined at 500° C. in dry air.

TABLE 7

Contents by Weight of NiO, MoO$_3$, WO$_3$, and P$_2$O$_5$, SBET, V$_{Hg}$ and DRT of Catalyst C24

| | C24 |
|---|---|
| NiO (% by Weight) | 3.4 |
| WO$_3$ (% by Weight) | 24.6 |
| MO$_3$ (% by Weight) | 3.1 |
| P$_2$O$_5$ (% by Weight) | 0 |
| Substrate | SA6 |

EXAMPLE 15

Standard Tests of Hydrogenation of Toluene and Isomerization of Cyclohexane of the Standard Catalysts C2, C3, C4, C7, C8, C9, C23 and Non-Standard Catalysts C1, C5, C6, C10 and C24.

Catalysts C1 to C10, C23 and C24, described above, are sulfurized in situ under dynamic conditions in a tubular fixed-bed reactor that is traversed by a Catatest-type pilot unit (manufacturer Géomécanique Company), whereby the fluids circulate from top to bottom. The measurements of hydrogenating and isomerizing activity are carried out immediately after pressurized sulfurization without returning to air with the hydrocarbon feedstock that was used to sulfurize the catalysts.

Table 7 compares the relative hydrogenating and isomerizing activities, equal to the ratio of the activity of the catalyst being considered to the activity of catalyst C24 that is taken as a reference (100% activity). The hydrogenating activity of the reference catalyst at iso-volume is 0.61, and the isomerizing activity of the reference catalyst at iso-volume is 0.097. The ratio is $A_{HYD}/A_{ISO}=6.28$.

TABLE 8

Relative Activities of Hydrogenation and Isomerization of Catalysts C1 to C10 and C23

| Catalyst | $A_{HYD}$<br>Relative to C24 | $A_{ISOM}$<br>Relative to C24 |
|---|---|---|
| C24 | 100 | 100 |
| C1 | 219 | 162 |
| C2 | 219 | 170 |
| C3 | 321 | 236 |
| C4 | 280 | 206 |
| C5 | 180 | 141 |
| C6 | 220 | 164 |
| C7 | 235 | 175 |
| C8 | 324 | 210 |
| C9 | 282 | 207 |
| C10 | 182 | 142 |
| C23 | 290 | 215 |

In a surprisingly way, Table 8 shows the significant increase in activity obtained in the catalysts that are prepared according to the invention relative to the reference catalyst.

Furthermore, Table 8 also demonstrates the relative particularly elevated activities of hydrogenation and isomerization of catalysts C3, C4, C8, C9 and C23 according to the invention relative to catalysts C2 and C7, themselves according to the invention.

It therefore seems that these catalysts C3, C4, C8, C9 and C23, which have a phosphorus content that is selected in the preferred range of 0.2% to 2.5% by weight of oxide of the phosphorus dopant, exhibit improved catalytic performance levels and are particularly suited for the production of middle distillates according to the object of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 04/09.546, filed Sep. 8, 2005 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst that comprises at least one hydro-dehydrogenating element that is selected from the group consisting of the elements of group VIB and group VIII of the periodic table, 0.01 to 5.5% by weight of oxide of a dopant that is selected from among phosphorus, boron and silicon, and a non-zeolitic substrate with a silica-alumina base that contains a quantity of more than 15% by weight and less than or equal to 95% by weight of silica ($SiO_2$), whereby said catalyst exhibits the following characteristics:
   a) a mean pore diameter, measured by mercury porosimetry, of between 20 and 140 Å,
   b) a total pore volume, measured by mercury porosimetry, of between 0.1 ml/g and 0.5 ml/g,
   c) a total pore volume, measured by nitrogen porosimetry, of between 0.1 ml/g and 0.5 ml/g,
   d) a BET specific surface area of between 100 and 550 m$^2$/g,
   e) a pore volume, measured by mercury porosimetry, encompassed in the pores with a diameter of more than 140 Å, of less than 0.1 ml/g,
   f) a pore volume, measured by mercury porosimetry, encompassed in the pores with a diameter of more than 160 Å, of less than 0.1 ml/g,
   g) a pore volume, measured by mercury porosimetry, encompassed in the pores with a diameter of more than 200 Å, of less than 0.1 ml/g,
   h) a pore volume, measured by mercury porosimetry, encompassed in the pores with a diameter of more than 500 Å, of at least about 0.03 ml/g and of less than 0.09 ml/g,
   i) an X-ray diffraction diagram that contains at least the main lines that are characteristic of at least one of the transition aluminas contained in the group that consists of the alpha-, rho-, chi-, eta-, gamma-, kappa-, theta- and delta-aluminas,
   j) a packing density of catalysts of more than 0.75 g/cm$^3$.

2. A catalyst according to claim 1, in which the pore volume, measured by mercury porosimetry, encompassed in the pores with a diameter of more than 140 Å, is less than 0.05 ml/g.

3. A catalyst according to claim 1, in which the pore volume, measured by mercury porosimetry, encompassed in the pores with a diameter of more than 500 Å, is at least about 0.032 ml/g.

4. A catalyst according to claim 1, in which the pore volume, measured by mercury porosimetry, encompassed in the pores with a diameter of more than 500 Å, is at least about 0.04 ml/g.

5. A catalyst according to claim 1, in which the pore volume, measured by mercury porosimetry, encompassed in the pores with a diameter of more than 500 Å, is at least about 0.045 ml/g.

6. A catalyst according to claim 1, in which the non-zeolitic substrate with a silica-alumina base contains a quantity of more than 20% by weight and less than or equal to 80% by weight of silica.

7. A catalyst according to claim 1, in which the dopant is boron and/or phosphorus.

8. A catalyst according to claim 1, in which the dopant is phosphorus.

9. A catalyst according to claim 8, in which the phosphorus content is encompassed between 0.01 and 4% by weight of oxide.

10. A catalyst according to claim 8, in which the phosphorus content is encompassed between 0.01 and 2.5% by weight of oxide.

11. In a process comprising subjecting to hydrocarbon feedstocks hydrotreatment in the presence of a catalyst, the improvement wherein the catalyst is in accordance with claim 10.

12. A process according to claim 11 comprising conducting said process upstream from a hydrocracking process.

13. A process according to claim 12, wherein the hydrocracking catalyst has a base of nickel and tungsten.

14. A catalyst according to claim 8, in which the dopant is phosphorus is present in a content encompassed between 0.2 and 2.5% by weight of oxide.

15. A catalyst according to claim 14, with a base comprising nickel and tungsten.

16. A catalyst according to claim 1, with a base of molybdenum and tungsten.

17. A catalyst according to claim 1, in which the proportion of octahedral $Al_{VI}$ that is determined by the analysis of NMR MAS spectra of the solid of $^{27}Al$ is more than 50%.

18. A catalyst according to claim 1, that comprises at least one element of group VIIB.

19. A catalyst according to claim 1, that comprises at least one element of group VB.

20. A catalyst according to claim 1, characterized in that it does not comprise fluorine.

21. A catalyst according to claim 1, with a pore distribution such that the ratio between volume V2, measured by mercury porosimetry, encompassed between $D_{mean}$−30 Å and $D_{mean}$+30 Å, to the total pore volume, measured by mercury porosimetry, is more than 0.6, –the volume V3, measured by mercury porosimetry, encompassed in the pores with a diameter of more than $D_{mean}$+30 Å, is less than 0.1 ml/g, –volume V6, measured by mercury porosimetry, encompassed in the pores with a diameter of more than $D_{mean}$+15 Å, is less than 0.2 ml/g.

22. A catalyst according to claim 1, such that the X-ray diffraction diagram contains at least the primary lines that are characteristic of at least one of the transition aluminas encompassed in the group that consists of the eta-, theta, delta- and gamma-aluminas.

23. A catalyst according to claim 1, wherein the BET surface area is less than 350 m$^2$/g.

24. A catalyst according to claim 1, wherein the packing density of the catalysts is more than 0.85 g/cm³.

25. A catalyst according to claim 1, such that the substrate comprises at least two aluminosilicate zones that have Si/Al ratios that are less than or greater than the overall Si/Al ratio that is determined by X-ray fluorescence.

26. A catalyst according to claim 1, such that the substrate comprises a single aluminosilicate zone that has an Si/Al ratio that is equal to the overall Si/Al ratio that is determined by X-ray fluorescence and that is less than 2.3.

27. A catalyst according to claim 1, comprising a minor proportion of at least one stabilizing element that is selected from the group consisting of zirconia and titanium.

28. A catalyst according to claim 1, that in the standard activity test exhibits a hydrogenating activity $A_{HYD}>0.7$ and an isomerizing activity $A_{ISOM}>0.1$.

29. A catalyst according to claim 28, wherein the ratio $A_{HYD}/A_{ISOM}$ is encompassed between 6.5 and 30.

30. In a process comprising subjecting hydrocarbon feedstocks to a hydrocracking/hydroconversion process in the presence of a catalyst the improvement wherein the catalyst is in accordance with claim 1.

31. A hydrocracking/hydroconversion process according to claim 30 comprising conducting a single-stage process.

32. A process for hydrocracking and/or hydroconversion according to claim 30 that comprises at least a first hydrorefining reaction zone and at least a second reaction zone that comprises a hydrocracking of at least a portion of the effluent of the first zone and that comprises an incomplete separation of ammonia from the effluent that exits from the first zone.

33. A hydrocracking/hydroconversion process according to claim 30 that comprises:

k) A first hydrorefining reaction zone in which the feedstock is brought into contact with at least one hydrorefining catalyst that exhibits a cyclohexane conversion level that is less than 10% by mass in the standard activity test.

l) A second hydrocracking reaction zone in which at least a portion of the effluent that is obtained from the hydrorefining stage is brought into contact with at least one zeolitic hydrocracking catalyst that exhibits a cyclohexane conversion level that is higher than 10% by mass in the standard activity test.

34. A hydrocracking/hydroconversion process according to claim 30 comprising a two-stage process.

35. A process according to claim 30 that operates, in the presence of hydrogen, at a temperature of more than 200° C., under a pressure of more than 1 MPa, whereby the volumetric flow rate is encompassed between 0.1 and 20h⁻¹ and the quantity of hydrogen that is introduced is such that the liter of hydrogen/liter of hydrocarbon volumetric ratio is encompassed between 80 and 5000 l/l.

36. A hydrocracking/hydroconversion process according to claim 30 that operates at a pressure of between 2 and 6 MPa and that leads to conversions of less than 40%.

37. A process according to claim 30 that operates in a fixed bed.

38. A process according to claim 30 that operates in a boiling bed.

39. A process according to claim 30, wherein the hydrocarbon feedstocks are selected from the group consisting of (light cycle oil (LCO): light gas oils obtained from a catalytic cracking unit), atmospheric distillates, vacuum distillates, feedstocks obtained from units for extracting aromatic compounds from lubricating oil bases or obtained from solvent dewaxing of lubricating oil bases, distillates obtained from processes for desulfurization or hydroconversion in a fixed bed or in a boiling bed of RAT (atmospheric residues) and/or RSV (vacuum residues) and/or deasphalted oils, deasphalted oils, by themselves or in a mixture.

40. A process according to claim 30, wherein the hydrocarbon feedstock is first contacted with a catalyst bed or adsorbent bed that is different from the hydrocracking/hydroconversion or hydrotreatment catalyst.

41. A catalyst according to claim 1, wherein said non-zeolitic substrate with a silica-alumina base is produced starting from a mixture of an alumina compound partially soluble in an acid medium with (a) a totally soluble silica compound or with (b) a totally soluble combination of hydrated alumina and silica, which mixture is shaped and the resultant shaped article is subjected to a hydrothermal or thermal treatment so as to homogenize the article on a micrometer scale.

42. In a process comprising subjecting a hydrocarbon feedstock to a hydrocracking/hydroconversion reaction in the presence of a catalyst, the improvement wherein the catalyst is the catalyst of claim 41.

* * * * *